United States Patent
Mori et al.

(10) Patent No.: US 11,735,737 B2
(45) Date of Patent: Aug. 22, 2023

(54) BINDER FOR ELECTRICITY STORAGE DEVICES IMPROVING DISPERSIBILITY OF CONDUCTIVE ASSISTANT

(71) Applicant: FUJIFILM WAKO PURE CHEMICAL CORPORATION, Osaka (JP)

(72) Inventors: Kaho Mori, Kawagoe (JP); Tomoyuki Mori, Kawagoe (JP); Kazuki Takimoto, Kawagoe (JP); Masahiro Takano, Kawagoe (JP); Kei Kawano, Kawagoe (JP)

(73) Assignee: FUJIFILM WAKO PURE CHEMICAL CORPORATION, Osaka (JP)

(*) Notice: Subject to any disclaimer, the term of this patent is extended or adjusted under 35 U.S.C. 154(b) by 0 days.

(21) Appl. No.: 17/637,650

(22) PCT Filed: Aug. 28, 2020

(86) PCT No.: PCT/JP2020/032585
§ 371 (c)(1),
(2) Date: Feb. 23, 2022

(87) PCT Pub. No.: WO2021/039959
PCT Pub. Date: Mar. 4, 2021

(65) Prior Publication Data
US 2022/0190343 A1 Jun. 16, 2022

(30) Foreign Application Priority Data

Aug. 29, 2019 (JP) ................................ 2019-156698
Mar. 27, 2020 (JP) ................................ 2020-057233
Jul. 22, 2020 (JP) ................................ 2020-125295

(51) Int. Cl.
| | | |
|---|---|---|
| *H01M 4/133* | (2010.01) | |
| *H01B 1/24* | (2006.01) | |
| *C08F 220/06* | (2006.01) | |
| *H01M 4/62* | (2006.01) | |
| *C08L 33/08* | (2006.01) | |
| *C08L 33/10* | (2006.01) | |
| *H01M 4/134* | (2010.01) | |
| *C08F 220/28* | (2006.01) | |
| *H01G 11/06* | (2013.01) | |
| *H01G 11/38* | (2013.01) | |
| *H01M 10/0525* | (2010.01) | |
| *H01M 4/02* | (2006.01) | |

(52) U.S. Cl.
CPC .......... *H01M 4/622* (2013.01); *C08F 220/06* (2013.01); *C08F 220/281* (2020.02); *C08L 33/08* (2013.01); *C08L 33/10* (2013.01); *H01B 1/24* (2013.01); *H01G 11/06* (2013.01); *H01G 11/38* (2013.01); *H01M 4/133* (2013.01); *H01M 4/134* (2013.01); *H01M 4/625* (2013.01); *H01M 10/0525* (2013.01); *C08F 2800/20* (2013.01); *H01M 2004/021* (2013.01)

(58) Field of Classification Search
CPC .......... H01B 1/00; H01B 1/24; H01M 4/133; H01M 4/622; C08F 220/281; C08F 220/06; C08L 33/08; C08L 33/10
See application file for complete search history.

(56) References Cited

U.S. PATENT DOCUMENTS

| | | | |
|---|---|---|---|
| 7,410,601 B2* | 8/2008 | Sato ...................... | H05K 1/092 252/514 |
| 2006/0192180 A1* | 8/2006 | Ichitani .................. | C08J 5/18 252/500 |
| 2013/0273468 A1* | 10/2013 | Korchev ................. | H01B 1/24 430/108.7 |
| 2017/0040612 A1 | 2/2017 | Komaba et al. | |
| 2019/0157678 A1 | 5/2019 | Yamamoto et al. | |

FOREIGN PATENT DOCUMENTS

| | | |
|---|---|---|
| JP | S63-236258 A | 10/1988 |
| JP | H08-190912 A | 7/1996 |
| JP | H10-324822 A | 12/1998 |
| JP | 2005-187605 A | 7/2005 |
| JP | 2008-038073 A | 2/2008 |
| JP | 2012-195243 A | 10/2012 |

(Continued)

OTHER PUBLICATIONS

English language translation of form PCT/ISA/237 dated Nov. 10, 2020.*

(Continued)

*Primary Examiner* — Mark Kopec
(74) *Attorney, Agent, or Firm* — Hamre, Schumann, Mueller & Larson, P.C.

(57) ABSTRACT

An object of the present invention is to provide a binder which exhibits excellent dispersibility of a conductive assistant; a slurry composition and an electrode, each of which uses this binder; and an electricity storage device which is provided with this electrode.

The present invention relates to a binder for an electricity storage device, in which a loss tangent tan δ in a linear region of an aqueous dispersion liquid of 0.5% by mass of the binder and 4.6% by mass of a conductive assistant satisfies tan δ>1 in a strain dispersion measurement under measurement conditions of a measurement temperature of 25° C. and a frequency of 1 Hz, and the conductive assistant is an acetylene black having an average particle diameter of 30 nm or more and 40 nm or less and a specific surface area of 65 m²/g or more and 70 m²/g or less; a slurry composition and an electrode, each of which uses this binder; an electricity storage device which is provided with this electrode; and the like.

11 Claims, No Drawings

(56) References Cited

FOREIGN PATENT DOCUMENTS

| | | |
|---|---|---|
| JP | 2013-161664 A | 8/2013 |
| JP | 2013-206759 A | 10/2013 |
| JP | 2016-054113 A | 4/2016 |
| JP | 2016-072234 A | 5/2016 |
| JP | 2016-155927 A | 9/2016 |
| JP | 2016-219358 A | 12/2016 |
| JP | 2018-198199 A | 12/2018 |
| WO | 2015/163302 A1 | 10/2015 |
| WO | 2018/003636 A1 | 1/2018 |

OTHER PUBLICATIONS

Advances in Chemistry Research, vol. 21, James C. Taylor Editor, 2014, 258 pages.*
International Search Report and Written Opinion; International Patent Application No. PCT/JP2020/032585; dated Nov. 10, 2020 (10 pages).

* cited by examiner

BINDER FOR ELECTRICITY STORAGE DEVICES IMPROVING DISPERSIBILITY OF CONDUCTIVE ASSISTANT

TECHNICAL FIELD

The present invention relates to a binder used in an electricity storage device, a slurry composition and an electrode, and an electricity storage device including the electrode.

BACKGROUND ART

In recent years, a battery (electricity storage device) used in a mobile terminal such as a notebook computer or a mobile phone, a hybrid car, an electric vehicle, an electrically power assisted bicycle, or the like is rapidly becoming widespread, and is required to be further reduced in size and weight. A lithium ion secondary battery having an advantage of high energy density and light weight is attracting attention as an electricity storage device used in these products.

Usually, an electrode used for a lithium ion secondary battery or the like contains a collector and an electrode mixture layer formed on the collector. A negative electrode mixture layer, which is an electrode mixture layer in a negative electrode, is generally formed in such a manner that a negative electrode active material typified by graphite or silicon, a conductive assistant typified by acetylene black or carbon black, a binder, and the like are dispersed or dissolved in a dispersion medium to obtain a slurry for a negative electrode mixture layer (slurry for an electrode mixture layer), the obtained slurry is coated on a collector, followed by drying, and the negative electrode active material, the conductive assistant, and the like are bound with a binder.

The characteristics required for this slurry for an electrode mixture layer include the uniformity in a case where an active material or a conductive assistant is dispersed or dissolved in a dispersion medium. This is because the dispersed state of the active material and the conductive assistant in the slurry for an electrode mixture layer is related to the distributed state of the active material and the conductive assistant in the electrode mixture layer, which affects the physical properties of the electrode and the battery performance. In particular, among the conductive assistants, a carbon material having excellent conductivity has a small particle size and a large specific surface area, thus exhibiting a strong cohesive force, which makes it difficult for the carbon material to be uniformly mixed and dispersed in the slurry for an electrode mixture layer. In a case where the dispersibility and particle size of the carbon material are not sufficiently controlled, the internal resistance of the electrode cannot be reduced because a uniform conductive network is not formed, and as a result, there arises a problem that the performance of the electrode material cannot be sufficiently brought out. For that reason, improving the dispersibility of the conductive assistant is an important issue.

Therefore, various methods for dispersing the conductive assistant in the slurry for an electrode mixture layer have been studied. For example, Patent Literature 1 and Patent Literature 2 describe an example in which a surfactant is used as a dispersant in a case where carbon black is dispersed in a solvent. In addition, Patent Literature 3 and Patent Literature 4 describe an example in which various additives are added in a case where a conductive assistant is dispersed.

In addition, various studies have been conducted on an electrode coated with a slurry to improve flexibility of the electrode in order to prevent cracks due to winding and trimming at the time of producing a battery, and expansion and contraction of an active material during repeated charge and discharge of the battery. For example, Patent Literature 5 and Patent Literature 6 describe an example in which a polymer containing a specific monomer component in a predetermined ratio is used. In addition, Patent Literature 7 describes an example in which flexibility of the electrode is improved by adding a composite body of carbon nanotubes.

CITATION LIST

Patent Literature

Patent Literature 1: JP1988-236258A (JP-S63-236258A)
Patent Literature 2: JP1996-190912A (JP-H08-190912A)
Patent Literature 3: JP2013-206759A
Patent Literature 4: JP2012-195243A
Patent Literature 5: JP2016-155927A
Patent Literature 6: WO2018/003636A
Patent Literature 7: JP2016-054113A

SUMMARY OF INVENTION

Technical Problem

However, since the surfactant described in Patent Literature 1 and Patent Literature 2 has a weak adsorption force on the surface of the carbon material, the amount of the surfactant added should be increased in order to obtain good dispersion stability. As a result, there is a problem that the amount of the active material that can be contained in the electrode mixture layer is reduced and therefore the battery capacity is lowered. In addition, in a case where the adsorption of the surfactant to the carbon material is insufficient, there is a problem that the aggregation of the carbon material cannot be suppressed and therefore the dispersibility remains insufficient.

In addition, the dispersant described in Patent Literature 3 and Patent Literature 4 is a low-molecular-weight substance and therefore may be eluted from an electrode mixture layer into an electrolytic solution, which may adversely affect the battery performance. In addition, in a case where the dispersant to be added has poor compatibility with a binder polymer or a solvent, there is a problem that the battery performance is deteriorated.

On the other hand, in terms of electrode flexibility, the polymer to which the monomer described in Patent Literature 5 and Patent Literature 6 is added exhibits a main skeleton of the polymer becoming flexible and therefore has a problem that a conductive path between the active materials is lost, resulting from the expansion and contraction of the active materials due to charge and discharge of the battery, and the battery capacity is lowered. In addition, since a water-dispersible polymer has a low viscosity, there is a problem that the polymer needs to be used in combination with a thickener such as carboxymethyl cellulose.

In addition, since the composite body of carbon nanotubes described in Patent Literature 7 does not contain a binder polymer, the composite body may peel off from a current collecting foil of an electrode in a case where charge and discharge of the battery are repeated, and the battery may not withstand long-term use. In addition, it is necessary to increase the formulation amount of carbon nanotubes in order to increase the strength of the composite body sheet, and as a result, there is a problem that the proportion of the active material in the electrode is reduced and the energy density of the battery is lowered.

The present invention has been made in view of such circumstances, and an object of the present invention is to provide a binder having excellent dispersibility that solves the problems described above, or a binder capable of imparting excellent flexibility to an electrode, a slurry composition and an electrode using the same, and an electricity storage device provided with the electrode.

Solution to Problem

As a result of extensive studies, the present inventors have found that an electricity storage device having excellent dispersibility of a conductive assistant and capable of maintaining a high capacity for a long period of time can be obtained by using a binder in which a loss tangent tan δ in a linear region of an aqueous dispersion liquid containing specific amounts of a conductive assistant and a binder satisfies tan δ>1 in the strain dispersion measurement in the electricity storage device. A first invention has been completed based on this finding.

In addition, as a result of extensive studies, the present inventors have found that the flexibility of an electrode is improved, which makes it possible to produce an electrode having excellent winding properties and an electricity storage device provided with the electrode, by using a binder containing a salt of a polymer neutralized by a specific neutralizing agent. A second invention has been completed based on this finding.

That is, the first invention encompasses the following inventions [i] to [xi].

[i] A binder for an electricity storage device, in which a loss tangent tan δ in a linear region of an aqueous dispersion liquid of 0.5% by mass of the binder and 4.6% by mass of a conductive assistant satisfies tan δ>1 in a strain dispersion measurement under measurement conditions of a measurement temperature of 25° C. and a frequency of 1 Hz, in a case where the conductive assistant is an acetylene black having an average particle diameter of 30 nm or more and 40 nm or less and a specific surface area of 65 m²/g or more and 70 m²/g or less (hereinafter, sometimes referred to simply as the binder of the first invention).

[ii] The binder according to the invention [i], in which the binder contains a polymer or a salt thereof containing structural units derived from (i) an ethylenically unsaturated carboxylic acid monomer and (ii) an ethylenically unsaturated monomer having at least one group selected from a hydroxy group, a dialkylamino group, an acetyl group, a sulfo group, a phosphate group, or a cyano group.

[iii] The binder according to the invention [ii], in which the monomer of (ii) has a solubility in water at 20° C. of 1 g/L or more.

[iv] The binder according to the invention [ii] or [iii], in which the monomer of (ii) has an SP value of 11.5 (cal/cm³)$^{1/2}$ or more.

[v] The binder according to any one of the inventions [ii] to [iv], in which the monomer of (ii) is a monomer represented by the following general formula [1].

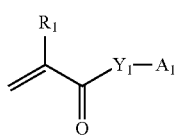

[1]

(In the general formula [1], $R_1$ represents a hydrogen atom or a methyl group, $Y_1$ represents —O— or —$NR_2$—, $R_2$ represents a hydrogen atom or a methyl group, and $A_1$ represents a monovalent group having at least one group selected from a hydroxy group, a dialkylamino group, an acetyl group, a sulfo group, a phosphate group, or a cyano group.)

[vi] The binder according to any one of the inventions [ii] to [v], in which the monomer of (ii) is a monomer represented by the following general formula [2].

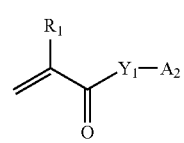

[2]

(In the general formula [2], $R_1$ represents a hydrogen atom or a methyl group, $Y_1$ represents —O— or —$NR_2$—, $R_2$ represents a hydrogen atom or a methyl group, and $A_2$ represents an alkyl group having 1 to 10 carbon atoms and having 1 to 3 groups of any one selected from a hydroxy group, a dialkylamino group, an acetyl group, a sulfo group, a phosphate group, or a cyano group; or a linear alkyl group having 3 to 36 carbon atoms and having 1 hydroxy group and 1 to 5 ester bonds in a chain thereof.)

[vii] The binder according to any one of the inventions [ii] to [vi], in which the polymer or the salt thereof further contains a structural unit derived from (iii) a monomer having two or more polymerizable unsaturated groups.

[viii] The binder according to any one of the inventions [ii] to [vii], in which the polymer or the salt thereof is neutralized with a hydroxide of an alkali metal and/or a polyvalent amine having an amine value of 21 or more.

[ix] A slurry composition for an electricity storage device containing the binder according to any one of the inventions [i] to [viii] (hereinafter, sometimes referred to simply as the slurry composition of the first invention).

[x] An electrode for an electricity storage device consisting of the slurry composition according to the invention [ix] (hereinafter, sometimes referred to simply as the electrode of the first invention).

[xi] An electricity storage device including the electrode according to the invention [x] (hereinafter, sometimes referred to simply as the electricity storage device of the first invention).

In addition, the second invention encompasses the following inventions [xii] to [xxi].

[xii] A binder for an electricity storage device (hereinafter, sometimes referred to simply as the binder of the second invention), in which the binder contains a salt of a polymer containing structural units derived from (i) an ethylenically unsaturated carboxylic acid monomer and (ii) an ethylenically unsaturated monomer having at least one group selected from a hydroxy group, a dialkylamino group, an acetyl group, a sulfo group, a phosphate group, or a cyano group and neutralized with a monoamine, a polyvalent amine having an amine value of less than 21, and/or an onium hydroxide.

[xiii] The binder according to the invention [xii], in which the polyvalent amine has a molecular weight of 600 or less.

[xiv] The binder according to the invention [xii] or [xiii], in which the monomer of (ii) has a solubility in water at 20° C. of 1 g/L or more.

[xv] The binder according to any one of the inventions [xii] to [xiv], in which the monomer of (ii) has an SP value of 11.5 (cal/cm$^3$)$^{1/2}$ or more.

[xvi] The binder according to any one of the inventions [xii] to [xv], in which the monomer of (ii) is a monomer represented by the following general formula [1].

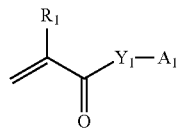

[1]

(In the general formula [1], $R_1$ represents a hydrogen atom or a methyl group, $Y_1$ represents —O— or —$NR_2$—, $R_2$ represents a hydrogen atom or a methyl group, and $A_1$ represents a monovalent group having at least one group selected from a hydroxy group, a dialkylamino group, an acetyl group, a sulfo group, a phosphate group, or a cyano group.)

[xvii] The binder according to any one of the inventions [xii] to [xvi], in which the monomer of (ii) is a monomer represented by the following general formula [2].

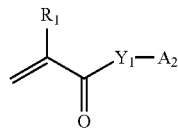

[2]

(In the general formula [2], $R_1$ represents a hydrogen atom or a methyl group, $Y_1$ represents —O— or —$NR_2$—, $R_2$ represents a hydrogen atom or a methyl group, and $A_2$ represents an alkyl group having 1 to 10 carbon atoms and having 1 to 3 groups of any one selected from a hydroxy group, a dialkylamino group, an acetyl group, a sulfo group, a phosphate group, or a cyano group; or a linear alkyl group having 3 to 36 carbon atoms and having 1 hydroxy group and 1 to 5 ester bonds in a chain thereof.)

[xviii] A slurry composition for an electricity storage device containing the binder according to any one of the inventions [xii] to [xvii] (hereinafter, sometimes referred to simply as the slurry composition of the second invention).

[xix] An electrode for an electricity storage device consisting of the slurry composition according to the invention [xviii] (hereinafter, sometimes referred to simply as the electrode of the second invention).

[xx] An electricity storage device including the electrode according to the invention [xix] (hereinafter, sometimes referred to simply as the electricity storage device of the second invention).

Advantageous Effects of Invention

Using the binder of the first invention leads to excellent dispersibility of a conductive assistant, which makes it possible to provide an electricity storage device capable of maintaining a high capacity for a long period of time.

In addition, using the binder of the second invention for the production of an electrode leads to improved flexibility of the electrode, which makes it possible to provide an electrode having excellent winding properties, and an electricity storage device provided with the electrode.

DESCRIPTION OF EMBODIMENTS

Binder of First Invention

The binder of the first invention is a binder in which a loss tangent tan δ in a linear region of an aqueous dispersion liquid of 0.5% by mass of a binder and 4.6% by mass of a conductive assistant in the strain dispersion measurement under the measurement conditions of a measurement temperature of 25° C. and a frequency of 1 Hz satisfies tan δ>1. The upper limit value of tan δ is not particularly limited and is, for example, 1<tan δ≤100, preferably 1<tan δ≤50, and more preferably 1<tan δ≤10.

The "linear region" indicates a region from the time in a case where a measurement is started in the strain dispersion measurement to the time in a case where the structural disorder of a measurement sample is started, and refers to a region in which the elastic modulus obtained in the strain dispersion measurement shows a constant value regardless of the increase in the amount of strain. It should be noted that the region after the start of structural disorder (the range in which the elastic modulus decreases depending on the increase in the amount of strain) is referred to as a non-linear region.

The "loss tangent tan δ" indicates a ratio of a storage elastic modulus G' and a loss elastic modulus G" (loss elastic modulus G"/storage elastic modulus G'), where the storage elastic modulus G' is an indicator of elastic properties and the loss elastic modulus G" is an indicator of viscous properties. Both the storage elastic modulus G' and the loss elastic modulus G" can be obtained by carrying out the strain dispersion measurement.

Specifically, the "loss tangent tan δ" may be calculated in such a manner that the storage elastic modulus G' and the loss elastic modulus G" in a case where the amount of strain is increased from 10$^{-2}$% to 10$^3$% are measured under the measurement conditions of a measurement temperature of 25° C. and a frequency of 1 Hz using a rheometer MCR 102 (dynamic viscoelasticity measuring device, manufactured by Anton Paar GmbH), and the loss elastic modulus G"/storage elastic modulus G' is calculated based on the obtained values.

Acetylene black having an average particle diameter of 30 nm or more and 40 nm or less and a specific surface area of 65 m$^2$/g or more and 70 m$^2$/g or less shall be used as the "conductive assistant". Specific examples of the acetylene black satisfying the average particle diameter conditions and the specific surface area conditions include DENKA BLACK (registered trademark) powder (manufactured by Denka Company Limited, average particle diameter: 35 nm, specific surface area: 68 m$^2$/g, representative values posted on the home page of Denka Company Limited).

Ion exchange water may be used as the "water" that is a dispersion medium in the "aqueous dispersion liquid".

Specific configurations of the binder of the first invention include a configuration that contains a polymer or a salt thereof containing structural units derived from (i) an ethylenically unsaturated carboxylic acid monomer and (ii) an ethylenically unsaturated monomer having at least one group selected from a hydroxy group, a dialkylamino group, an acetyl group, a sulfo group, a phosphate group, or a cyano group (hereinafter, sometimes referred to simply as the polymer according to the first invention).

(i) The ethylenically unsaturated carboxylic acid monomer (hereinafter, sometimes referred to simply as the monomer of (i)) is a monomer having both an ethylenically unsaturated group and a carboxy group in one molecule. However, the monomer of (i) has one ethylenically unsaturated group, unlike the monomer of (iii) which will be described later. In addition, the monomer of (i) may be an acid anhydride.

Specific examples of the monomer of (i) include ethylenically unsaturated monocarboxylic acid monomers such as acrylic acid, methacrylic acid, crotonic acid, isocrotonic acid, mono(2-acryloyloxyethyl)succinate, mono(2-acryloyloxyethyl)phthalate, and mono(2-acryloyloxyethyl)hexahydrophthalate; and ethylenically unsaturated dicarboxylic acid monomers such as maleic acid, fumaric acid, itaconic acid, maleic acid anhydride, and itaconic anhydride. Among these specific examples, an ethylenically unsaturated monocarboxylic acid monomer is preferable; acrylic acid or methacrylic acid is more preferable; and acrylic acid is particularly preferable. It should be noted that the monomer of (i) may be used alone or in combination of two or more thereof, and only one type thereof is preferably used.

(ii) The ethylenically unsaturated monomer having at least one group selected from a hydroxy group, a dialkylamino group, an acetyl group, a sulfo group, a phosphate group, or a cyano group (hereinafter, sometimes referred to simply as the monomer of (ii)) is a monomer having both a "group selected from a hydroxy group, a dialkylamino group, an acetyl group, a sulfo group, a phosphate group, or a cyano group" and an ethylenically unsaturated group in one molecule, and is not particularly limited as long as it is commonly used in the art. However, the monomer of (i) and the monomer of (ii) have different structures, and the hydroxy group in the monomer of (ii) does not contain a carboxy group, a sulfo group, and a phosphate group (the OH present in the carboxy group, sulfo group, and phosphate group does not correspond to the hydroxy group in the monomer of (ii)). In addition, the monomer of (ii) has one ethylenically unsaturated group, unlike the monomer of (iii) which will be described later.

Examples of the dialkylamino group in the monomer of (ii) include a dialkylamino group having 2 to 12 carbon atoms, among which a dialkylamino group having 2 to 8 carbon atoms is preferable. In addition, each of the two alkyl groups in the dialkylamino group may be linear, branched, or cyclic and is preferably linear or branched. Further, the two alkyl groups in the dialkylamino group may be the same or different from each other, and the two alkyl groups may be bonded to each other to form a heterocyclic structure. Specific examples of the dialkylamino group include a dimethylamino group, a diethylamino group, a di(n-propyl)amino group, a diisopropylamino group, a di(n-butyl)amino group, a diisobutylamino group, a morpholino group, and a piperidino group.

Examples of the monomer of (ii) include a monomer having a high solubility in water. Specifically, the monomer of (ii) is preferably a monomer having a solubility in water at 20° C. of 1 g/L or more; more preferably a monomer having a solubility in water at 20° C. of 100 g/L or more; and particularly preferably a monomer which dissolves in water at an arbitrary ratio.

In addition, the monomer of (ii) preferably has an SP value of 11.5 (cal/cm$^3$)$^{1/2}$ or more. The upper limit value of the SP value of the monomer of (ii) is not particularly limited and is preferably 25 (cal/cm$^3$)$^{1/2}$ or less. It should be noted that the SP value (Solubility Parameter) in the present invention (first invention and second invention) is calculated according to the Fedors method, and can be specifically obtained from the following calculation formula.

Calculation formula: $\delta = (\Delta E_{coh}/\Delta V)^{1/2}$ (In the calculation formula, δ represents an SP value (cal/cm$^3$)$^{1/2}$, $\Delta E_{coh}$ represents a molar cohesive energy (cal/mol), and $\Delta V$ represents a molar molecular volume (cm$^3$/mol).)

Examples of the ethylenically unsaturated group in the monomer of (ii) include an allyl group, a vinylaryl group, a vinyloxy group, an acryloyl group, and a methacryloyl group, among which the acryloyl group and the methacryloyl group are preferable, and the acryloyl group is more preferable.

The monomer of (ii) may be, for example, a monomer having at least one group selected from a hydroxy group, a dialkylamino group, an acetyl group, a sulfo group, a phosphate group, or a cyano group, and having an acryloyl group or a methacryloyl group. More specifically, the monomer of (ii) may be, for example, a monomer represented by the following general formula [1].

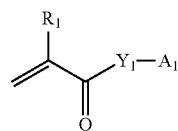

[1]

(In the general formula [1], $R_1$ represents a hydrogen atom or a methyl group, $Y_1$ represents —O— or —NR$_2$—, $R_2$ represents a hydrogen atom or a methyl group, and $A_1$ represents a monovalent group having at least one group selected from a hydroxy group, a dialkylamino group, an acetyl group, a sulfo group, a phosphate group, or a cyano group.)

$R_1$ of the general formula [1] is preferably a hydrogen atom.

In $Y_1$ of the general formula [1], $R_2$ in —NR$_2$— is preferably a hydrogen atom.

$Y_1$ of the general formula [1] is preferably —O— or —NH— and more preferably —O—.

Examples of the dialkylamino group in $A_1$ of the general formula [1] include the same dialkylamino groups in the monomer of (ii).

The "group selected from a hydroxy group, a dialkylamino group, an acetyl group, a sulfo group, a phosphate group, or a cyano group" contained in $A_1$ of the general formula [1] may be only one type or two or more types; and is preferably any one of a group selected from a hydroxy group, a dialkylamino group, an acetyl group, a sulfo group, a phosphate group, or a cyano group; more preferably any one of a group selected from a hydroxy group, a sulfo group, a phosphate group, or a cyano group; still more preferably any one of a group selected from a hydroxy group, a sulfo group, or a phosphate group; and particularly preferably a hydroxy group. In addition, $A_1$ of the general formula [1] may have at least one "group selected from a hydroxy group, a dialkylamino group, an acetyl group, a sulfo group, a phosphate group, or a cyano group". Above all, $A_1$ of the general formula [1] preferably has 1 to 3 groups, more preferably 1 or 2 groups, and particularly preferably 1 group among those groups.

The "monovalent group" in $A_1$ of the general formula [1] may be, for example, an alkyl group which may have an ester bond in a chain thereof.

Examples of the alkyl group in a case where the "alkyl group which may have an ester bond in a chain thereof" does not have an ester bond include an alkyl group having 1 to 30 carbon atoms, among which an alkyl group having 1 to 10 carbon atoms is preferable, an alkyl group having 1 to 6 carbon atoms is more preferable, and an alkyl group having 1 to 4 carbon atoms is still more preferable. In addition, the alkyl group may be linear, branched, or cyclic, and is preferably linear or branched and more preferably linear.

Examples of the alkyl group in a case where the "alkyl group which may have an ester bond in a chain thereof" has an ester bond include an alkyl group having 3 to 66 carbon atoms, among which an alkyl group having 3 to 36 carbon atoms is preferable, an alkyl group having 5 to 24 carbon atoms is more preferable, and an alkyl group having 7 to 18 carbon atoms is still more preferable. It should be noted that the number of carbon atoms in the alkyl group also contains the number of carbon atoms in the ester bond. In addition, the alkyl group is preferably linear. Further, the number of ester bonds contained in the alkyl group may be, for example, 1 to 10 and is preferably 1 to 5, more preferably 1 to 3, and still more preferably 1 to 2.

$A_1$ of the general formula [1] may be, for example, an alkyl group which has at least one group selected from a hydroxy group, a dialkylamino group, an acetyl group, a sulfo group, a phosphate group, or a cyano group, and may have an ester bond in a chain thereof. Above all, an alkyl group having 1 to 30 carbon atoms and having 1 to 3 groups selected from a hydroxy group, a dialkylamino group, an acetyl group, a sulfo group, a phosphate group, and a cyano group, and an alkyl group having 3 to 66 carbon atoms and having 1 hydroxy group and 1 to 10 ester bonds in a chain thereof are preferable; an alkyl group having 1 to 10 carbon atoms and having 1 to 3 groups of any one selected from a hydroxy group, a dialkylamino group, an acetyl group, a sulfo group, a phosphate group, or a cyano group, and a linear alkyl group having 3 to 36 carbon atoms and having 1 hydroxy group and 1 to 5 ester bonds in a chain thereof are more preferable; and an alkyl group having 1 to 10 carbon atoms and having 1 to 2 hydroxy groups, an alkyl group having 1 to 10 carbon atoms and having one of any one of a group selected a dialkylamino group, an acetyl group, a sulfo group, a phosphate group, or a cyano group, and a linear alkyl group having 5 to 24 carbon atoms and having one hydroxy group and 1 to 3 ester bonds in a chain thereof are still more preferable.

Specific examples of $A_1$ of the general formula [1] include groups represented by the following general formulae [1-1] to [1-4], among which a group represented by the general formula [1-1] is preferable.

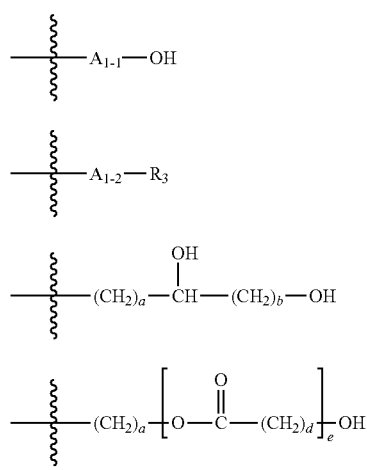

(In the general formulae [1-1] to [1-4], $A_{1-1}$ and $A_{1-2}$ each independently represent an alkylene group having 1 to 10 carbon atoms, $R_3$ represents a dialkylamino group, an acetyl group, a sulfo group, a phosphate group, or a cyano group, a represents an integer of 0 to 4, b represents an integer of 1 to 5, c represents an integer of 1 to 6, d represents an integer of 3 to 5, and e represents an integer of 1 to 3.)

The alkylene group having 1 to 10 carbon atoms in $A_{1-1}$ of the general formula [1-1] is preferably an alkylene group having 1 to 6 carbon atoms and more preferably an alkylene group having 1 to 4 carbon atoms. In addition, the alkylene group may be linear, branched, or cyclic, and is preferably linear or branched and more preferably linear. Specific examples of the alkylene group include a methylene group, an ethylene group, a methylmethylene group, a trimethylene group, a propylene group, an ethylmethylene group, a dimethylmethylene group, a tetramethylene group, a 1-methyltrimethylene group, a 2-methyltrimethylene group, a 1,1-dimethylethylene group, a 1,2-dimethylethylene group, an ethylethylene group, a propylmethylene group, an ethylmethylmethylene group, a pentamethylene group, a 1-methyltetramethylene group, a 1-ethyltrimethylene group, an n-propylethylene group, an n-butylmethylene group, a hexamethylene group, a 1-methylpentamethylene group, a 1-ethyltetramethylene group, a 1-n-propyltrimethylene group, an n-butylethylene group, an n-pentylmethylene group, a heptamethylene group, an octamethylene group, a nonamethylene group, a decamethylene group, a —$C_6H_{10}$— group, a —$CH_2$—$C_6H_{10}$— group, a —$C_2H_4$—$C_6H_{10}$— group, a —$C_3H_6$—$C_6H_{10}$— group, a —$C_4H_8$—$C_6H_{10}$— group, a —$C_6H_{10}$—$CH_2$— group, a —$C_6H_{10}$—$C_2H_4$— group, a —$C_6H_{10}$—$C_3H_6$— group, a —$C_6H_{10}$—$C_4H_8$— group, a —$CH_2$—$C_6H_{10}$—$CH_2$— group, and a —$C_2H_4$—$C_6H_{10}$—$C_2H_4$— group. Among these specific examples, a linear or branched alkylene group having 1 to 6 carbon atoms and a cyclic alkylene group having 6 to 8 carbon atoms are preferable; a linear or branched alkylene group having 1 to 4 carbon atoms is more preferable; and a linear or branched alkylene group having 2 to 4 carbon atoms is still more preferable.

Examples of the dialkylamino group in $R_3$ of the general formula [1-2] include the same dialkylamino groups in the monomer of (ii).

Specific examples of the group represented by the general formula [1-1] include a hydroxymethyl group, a 2-hydroxyethyl group, a 1-hydroxyethyl group, a 3-hydroxypropyl group, a 2-hydroxypropyl group, a 2-hydroxy-1-methylethyl group, a 1-hydroxypropyl group, a 1-hydroxy-1-methylethyl group, a 4-hydroxybutyl group, a 3-hydroxybutyl group, a 3-hydroxy-2-methylpropyl group, a 3-hydroxy-1-methylpropyl group, a 2-hydroxybutyl group, a 2-hydroxy-2-methylpropyl group, a 2-hydroxy-1-methylpropyl group, a 2-hydroxy-1,1-dimethylethyl group, a 1-hydroxybutyl group, a 1-hydroxy-1-methylpropyl group, a 5-hydroxypentyl group, a 4-hydroxypentyl group, a 2-hydroxypentyl group, a 1-hydroxypentyl group, a 6-hydroxyhexyl group, a 5-hydroxyhexyl group, a 2-hydroxyhexyl group, a 1-hydroxyhexyl group, a 7-hydroxyheptyl group, a 6-hydroxyheptyl group, a 2-hydroxyheptyl group, a 1-hydroxyheptyl group, a 8-hydroxyoctyl group, a 7-hydroxyoctyl group, a 2-hydroxyoctyl group, a 1-hydroxyoctyl group, a 9-hydroxynonyl group, a 8-hydroxynonyl group, a 2-hydroxynonyl group, a 1-hydroxynonyl group, a 10-hydroxydecyl group, a 9-hydroxydecyl group, a 2-hydroxydecyl group, a 1-hydroxydecyl group, a —$C_6H_{10}$—OH group, a —$CH_2$—$C_6H_{10}$—$CH_2$—OH group, and a —$C_2H_4$—$C_6H_{10}$—$C_2H_4$—OH group.

Among these specific examples, a linear or branched hydroxyalkyl group having 1 to 6 carbon atoms and a cyclic hydroxyalkyl group having 6 to 8 carbon atoms are preferable; a linear or branched hydroxyalkyl group having 1 to 4 carbon atoms is more preferable; and a linear or branched hydroxyalkyl group having 2 to 4 carbon atoms is still more preferable. More specifically, a hydroxymethyl group, a 2-hydroxyethyl group, a 1-hydroxyethyl group, a 3-hydroxypropyl group, a 2-hydroxypropyl group, a 2-hydroxy-1-methylethyl group, a 1-hydroxypropyl group, a 4-hydroxybutyl group, a 3-hydroxybutyl group, a 2-hydroxybutyl group, a 2-hydroxy-2-methylpropyl group, a 2-hydroxy-1-methylpropyl group, a 1-hydroxybutyl group, a 5-hydroxypentyl group, a 2-hydroxypentyl group, a 1-hydroxypentyl group, a 6-hydroxyhexyl group, a 5-hydroxyhexyl group, a 2-hydroxyhexyl group, a 1-hydroxyhexyl group, a —$C_6H_{10}$—OH group, and a —$CH_2$—$C_6H_{10}$—$CH_2$—OH group are preferable; the hydroxymethyl group, the 2-hydroxyethyl group, the 1-hydroxyethyl group, the 3-hydroxypropyl group, the 2-hydroxypropyl group, the 2-hydroxy-1-methylethyl group, the 1-hydroxypropyl group, the 4-hydroxybutyl group, the 3-hydroxybutyl group, the 2-hydroxybutyl group, the 2-hydroxy-2-methylpropyl group, the 2-hydroxy-1-methylpropyl group, the 1-hydroxybutyl group, the 5-hydroxypentyl group, the 6-hydroxyhexyl group, and the —$CH_2$—$C_6H_{10}$—$CH_2$—OH group are more preferable; the hydroxymethyl group, the 2-hydroxyethyl group, the 3-hydroxypropyl group, the 2-hydroxypropyl group, the 2-hydroxy-1-methylethyl group, the 4-hydroxybutyl group, and the 2-hydroxybutyl group are still more preferable; and the 2-hydroxyethyl group, the 2-hydroxypropyl group, the 2-hydroxy-1-methylethyl group, and the 4-hydroxybutyl groups are particularly preferable.

The alkylene group having 1 to 10 carbon atoms in $A_{1-2}$ of the general formula [1-2] is the same as the specific examples of the alkylene group having 1 to 10 carbon atoms in $A_{1-1}$ of the general formula [1-1], among which a linear or branched alkylene group having 1 to 6 carbon atoms is preferable, and a linear or branched alkylene group having 1 to 4 carbon atoms is more preferable.

$R_3$ of the general formula [1-2] is preferably a sulfo group, a phosphate group, or a cyano group and more preferably a sulfo group or a phosphate group.

Specific examples of the group represented by the general formula [1-2] include dialkylaminoalkyl groups having 3 to 12 carbon atoms such as a dimethylaminomethyl group, a 2-(dimethylamino)ethyl group, a 3-(dimethylamino)propyl group, a 4-(dimethylamino)butyl group, a diethylaminomethyl group, a 2-(diethylamino)ethyl group, a 3-(diethylamino)propyl group, a 4-(diethylamino)butyl group, a di(n-propyl)aminomethyl group, a 2-[di(n-propyl)amino]ethyl group, a 3-[di(n-propyl)amino]propyl group, a 4-[di(n-propyl)amino]butyl group, a diisopropylaminomethyl group, a 2-(diisopropylamino)ethyl group, a 3-(diisopropylamino) propyl group, a 4-(diisopropylamino)butyl group, a di(n-butyl)aminomethyl group, a 2-[di(n-butyl)amino]ethyl group, a 3-[di(n-butyl)amino]propyl group, a 4-[di(n-butyl)amino]butyl group, a diisobutylaminomethyl group, a 2-(diisobutylamino)ethyl group, a 3-(diisobutylamino)propyl group, a 4-(diisobutylamino)butyl group, a morpholinomethyl group, a 2-morpholinoethyl group, a 3-morpholinopropyl group, a 4-morpholinobutyl group, a piperidinomethyl group, a 2-piperidinoethyl group, a 3-piperidinopropyl group, and a 4-piperidinobutyl group; acetoalkyl groups having 3 to 6 carbon atoms such as an acetomethyl group, a 2-acetoethyl group, a 3-acetopropyl group, a 4-acetobutyl group, and a 1,1-dimethyl-2-acetoethyl group; sulfoalkyl groups having 1 to 6 carbon atoms such as a sulfomethyl group, a 2-sulfoethyl group, a 1-sulfoethyl group, a 3-sulfopropyl group, a 2-sulfopropyl group, a 1-sulfopropyl group, a 4-sulfobutyl group, a 3-sulfobutyl group, a 2-sulfobutyl group, a 1,1-dimethyl-2-sulfoethylene group, a 1-sulfobutyl group, a 5-sulfopentyl group, and a 6-sulfohexyl group; phosphonooxyalkyl groups having 1 to 6 carbon atoms (alkyl phosphate groups) such as a phosphonooxymethyl group, a 2-phosphonooxyethyl group, a 1-phosphonooxyethyl group, a 3-phosphonooxypropyl group, a 2-phosphonooxypropyl group, a 1-phosphonooxypropyl group, a 4-phosphonooxybutyl group, a 3-phosphonooxybutyl group, a 2-phosphonooxybutyl group, a 1-phosphonooxybutyl group, a 5-phosphonooxypentyl group, and a 6-phosphonooxyhexyl group; and cyanoalkyl groups having 2 to 7 carbon atoms such as a cyanomethyl group, a 2-cyanoethyl group, a 1-cyanoethyl group, a 3-cyanopropyl group, a 2-cyanopropyl group, a 1-cyanopropyl group, a 4-cyanobutyl group, a 3-cyanobutyl group, a 2-cyanobutyl group, a 1-cyanobutyl group, a 5-cyanopentyl group, and a 6-cyanohexyl group.

Among these specific examples, a linear or branched sulfoalkyl group having 1 to 4 carbon atoms, a linear phosphonooxyalkyl group having 1 to 4 carbon atoms, and a linear cyanoalkyl group having 2 to 5 carbon atoms more preferable; and the linear or branched sulfoalkyl group having 1 to 4 carbon atoms and the linear phosphonooxyalkyl group having 1 to 4 carbon atoms are more preferable. More specifically, a 2-(dimethylamino)ethyl group, a 2-(diethylamino)ethyl group, a 2-[di(n-propyl)amino]ethyl group, a 2-(diisopropylamino)ethyl group, a 2-[di(n-butyl)amino]ethyl group, a 2-(diisobutylamino)ethyl group, a 2-morpholinoethyl group, a 2-piperidinoethyl group, an acetomethyl group, a 2-acetoethyl group, a 1,1-dimethyl-2-acetoethyl group, a sulfomethyl group, a 2-sulfoethyl group, a 3-sulfopropyl group, a 2-sulfopropyl group, a 1-sulfopropyl group, a 4-sulfobutyl group, a 3-sulfobutyl group, a 2-sulfobutyl group, a 1,1-dimethyl-2-sulfoethylene group, a phosphonooxymethyl group, a 2-phosphonooxyethyl group, a 1-phosphonooxyethyl group, a 3-phosphonooxypropyl group, a 2-phosphonooxypropyl group, a 4-phosphonooxybutyl group, a cyanomethyl group, a 2-cyanoethyl group, a 1-cyanoethyl group, a 3-cyanopropyl group, a 1-cyanopropyl group, a 4-cyanobutyl group, and a 1-cyanobutyl group are preferable; the sulfomethyl group, the 2-sulfoethyl group, the 3-sulfopropyl group, the 4-sulfobutyl group, the 1,1-dimethyl-2-sulfoethylene group, the phosphonooxymethyl group, the 2-phosphonooxyethyl group, the 3-phosphonooxypropyl group, the 4-phosphonooxybutyl group, the cyanomethyl group, the 2-cyanoethyl group, the 3-cyanopropyl group, and the 4-cyanobutyl group are more preferable; and the 2-sulfoethyl group, the 3-sulfopropyl group, and the 2-phosphonooxyethyl group are still more preferable.

a and b of the general formula [1-3] are each preferably an integer of 1 to 4 and is preferably 1 or 2 and more preferably 1.

Specific examples of the group represented by the general formula [1-3] include a 1,2-dihydroxypropyl group, a 1,3-dihydroxypropyl group, a 2,3-dihydroxypropyl group, a 1,2-dihydroxybutyl group, a 1,3-dihydroxybutyl group, a 1,4-dihydroxybutyl group, a 2,3-dihydroxybutyl group, a 2,4-dihydroxybutyl group, a 3,4-dihydroxybutyl group, a 1,2-dihydroxypentyl group, a 1,3-dihydroxypentyl group, a 1,4-dihydroxypentyl group, a 1,5-hydroxypentyl group, a 2,3-dihydroxypentyl group, a 2,4-dihydroxypentyl group, a 2,5-hydroxypentyl group, a 3,4-dihydroxypentyl group, a 3,5-dihydroxypentyl group, a 4,5-hydroxypentyl group, a 1,2-dihydroxyhexyl group, a 1,3-dihydroxyhexyl group, a 1,4-dihydroxyhexyl group, a 1,5-hydroxyhexyl group, a 1,6-hydroxyhexyl group, a 2,3-dihydroxyhexyl group, a 2,4-dihydroxyhexyl group, a 2,5-hydroxyhexyl group, a 2,6-hydroxyhexyl group, a 3,4-dihydroxyhexyl group, a 3,5-dihydroxyhexyl group, a 3,6-dihydroxyhexyl group, a 4,5-hydroxyhexyl group, a 4,6-hydroxyhexyl group, and a 5,6-hydroxyhexyl group, among which the 2,3-dihydroxypropyl group, the 2,4-dihydroxybutyl group, the 3,4-dihydroxybutyl group, the 2,5-hydroxypentyl group, the 4,5-hydroxypentyl group, the 2,6-hydroxyhexyl group, and the 5,6-hydroxyhexyl group are preferable; the 2,3-dihydroxypropyl group, the 2,4-dihydroxybutyl group, and the 3,4-dihydroxybutyl group are more preferable; and the 2,3-dihydroxypropyl group is still more preferable.

c of the general formula [1-4] is preferably 2 or 4 and more preferably 2.

d of the general formula [1-4] is preferably 3 or 5 and more preferably 5.

e of the general formula [1-4] is preferably 1 or 2.

Specific examples of the group represented by the general formula [1-4] include the groups shown below.

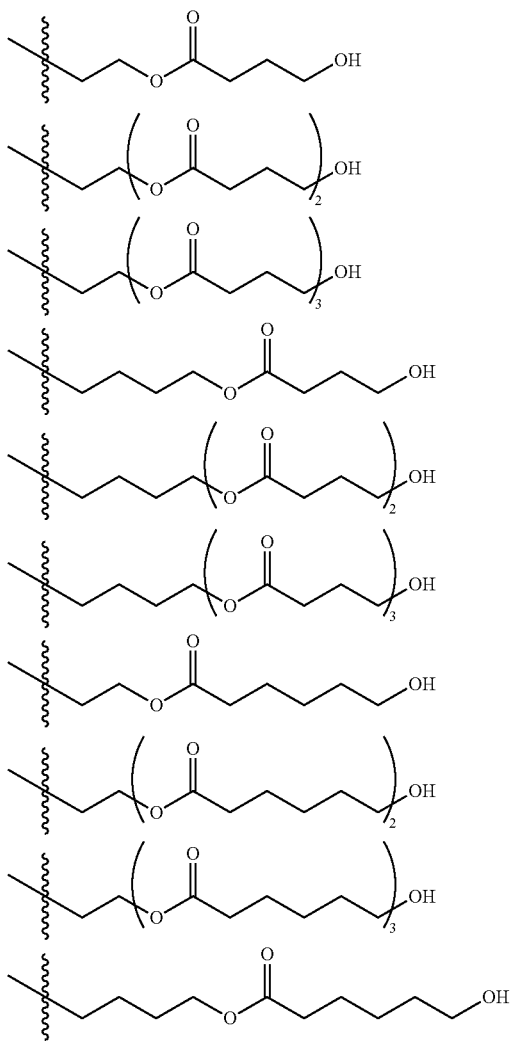

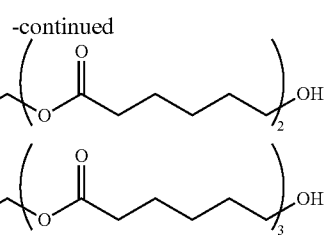

Among these specific examples, the groups shown below are preferable.

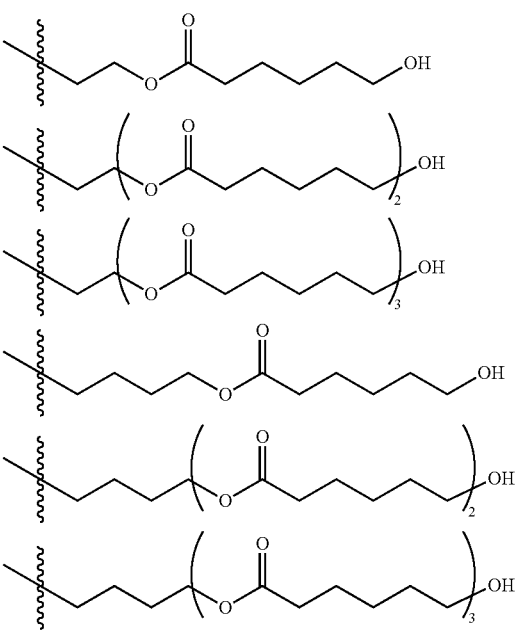

Among these specific examples, the groups shown below are more preferable.

Preferred specific examples of $A_1$ of the general formula [1] include the same specific examples of the groups represented by the general formulae [1-1] to [1-4], among which a hydroxymethyl group, a 2-hydroxyethyl group, a 1-hydroxyethyl group, a 3-hydroxypropyl group, a 2-hydroxypropyl group, a 2-hydroxy-1-methylethyl group, a 1-hydroxypropyl group, a 4-hydroxybutyl group, a 3-hydroxybutyl group, a 2-hydroxybutyl group, a 2-hydroxy-2-methylpropyl group, a 2-hydroxy-1-methylpropyl group, a 1-hydroxybutyl group, a 5-hydroxypentyl group, a 6-hydroxyhexyl group, a —$CH_2$—$C_6H_{10}$—$CH_2$—OH group, a sulfomethyl group, a 2-sulfoethyl group, a 3-sulfopropyl group, a 4-sulfobutyl group, a 1,1-dimethyl-2-sulfoethylene group, a phosphonooxymethyl group, a 2-phosphonooxyethyl group, a 3-phosphonooxypropyl group, a 4-phosphonooxybutyl group, a cyanomethyl group, a 2-cyanoethyl group, a 3-cyanopropyl group, a 4-cyanobutyl group, a 2,3-dihydroxypropyl group, a 2,4-dihydroxybutyl group, a 3,4-dihydroxybutyl group, and the groups shown below are more preferable.

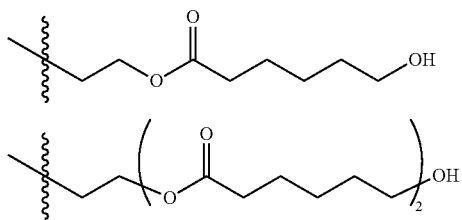

Among these preferred specific examples, a hydroxymethyl group, a 2-hydroxyethyl group, a 3-hydroxypropyl group, a 2-hydroxypropyl group, a 2-hydroxy-1-methylethyl group, a 4-hydroxybutyl group, a 2-hydroxybutyl group, a 2-sulfoethyl group, a 3-sulfopropyl group, a 2-phosphonooxyethyl group, and a 2,3-dihydroxypropyl group are more preferable; and the 2-hydroxyethyl group, the 2-hydroxypropyl group, the 2-hydroxy-1-methylethyl group, and the 4-hydroxybutyl group are particularly preferable.

Examples of the combination of $A_1$, $R_1$, and $Y_1$ in the general formula [1] include combinations 1 to 12 described in the following table. Among these combinations, combinations 1 to 10 are preferable, combinations 1, 2, 9, and 10 are more preferable, combinations 1, 2, and 9 are still more preferable, and combination 1 is particularly preferable.

| Combination | $A_1$ | $R_1$ | $Y_1$ |
|---|---|---|---|
| 1 | Group represented by general formula [1-1] | Hydrogen atom | —O— |
| 2 | Group represented by general formula [1-1] | Methyl group | —O— |
| 3 | Group represented by general formula [1-2] | Hydrogen atom | —O— |
| 4 | Group represented by general formula [1-2] | Methyl group | —O— |
| 5 | Group represented by general formula [1-3] | Hydrogen atom | —O— |
| 6 | Group represented by general formula [1-3] | Methyl group | —O— |
| 7 | Group represented by general formula [1-4] | Hydrogen atom | —O— |
| 8 | Group represented by general formula [1-4] | Methyl group | —O— |
| 9 | Group represented by general formula [1-1] | Hydrogen atom | —NH— |
| 10 | Group represented by general formula [1-1] | Methyl group | —NH— |
| 11 | Group represented by general formula [1-2] | Hydrogen atom | —NH— |
| 12 | Group represented by general formula [1-2] | Methyl group | —NH— |

Preferred specific examples of the monomer represented by the general formula [1] include a monomer represented by the following general formula [2].

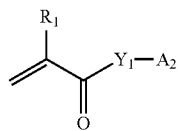

(In the general formula [2], $A_2$ represents an alkyl group having 1 to 10 carbon atoms and having 1 to 3 groups of any one selected from a hydroxy group, a dialkylamino group, an acetyl group, a sulfo group, a phosphate group, or a cyano group; or a linear alkyl group having 3 to 36 carbon atoms and having 1 hydroxy group and 1 to 5 ester bonds in a chain thereof, and $R_1$ and $Y_1$ are as defined hereinbefore.)

Specific examples of the "alkyl group having 1 to 10 carbon atoms and having 1 to 3 groups of any one selected from a hydroxy group, a dialkylamino group, an acetyl group, a sulfo group, a phosphate group, or a cyano group" and the "linear alkyl group having 3 to 36 carbon atoms and having 1 hydroxy group and 1 to 5 ester bonds in a chain thereof" of $A_2$ of the general formula [2] include the same specific examples of the groups represented by the general formulae [1-1] to [1-4], and preferred examples thereof are also the same.

$A_2$ of the general formula [2] is preferably an alkyl group having 1 to 10 carbon atoms and having 1 to 2 hydroxy groups; an alkyl group having 1 to 10 carbon atoms and having one of any one of a group selected from a dialkylamino group, an acetyl group, a sulfo group, a phosphate group, or a cyano group; or a linear alkyl group having 5 to 24 carbon atoms and having 1 hydroxy group and 1 to 3 ester bonds in a chain thereof, more preferably a group represented by the general formulae [1-1] to [1-4], and still more preferably a group represented by the general formula [1-1]. More specific examples of $A_2$ of the general formula [2] include the same preferred specific examples of $A_1$ of the general formula [1], and preferred examples thereof are also the same.

Examples of the combination of $A_2$, $R_1$, and $Y_1$ in the general formula [2] include the same combinations of $A_1$, $R_1$, and $Y_1$ in the general formula [1], and preferred examples thereof are also the same.

Specific examples of the monomer represented by the general formula [2] include the following monomers.

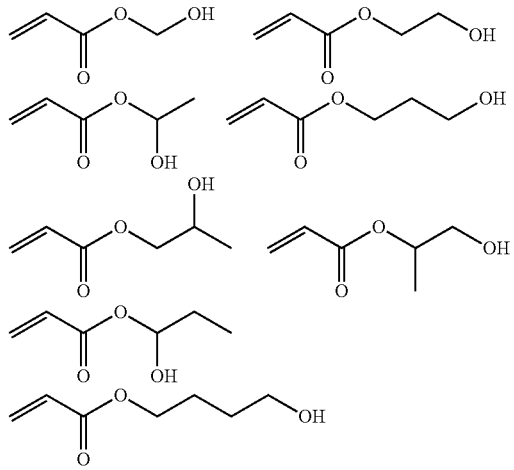

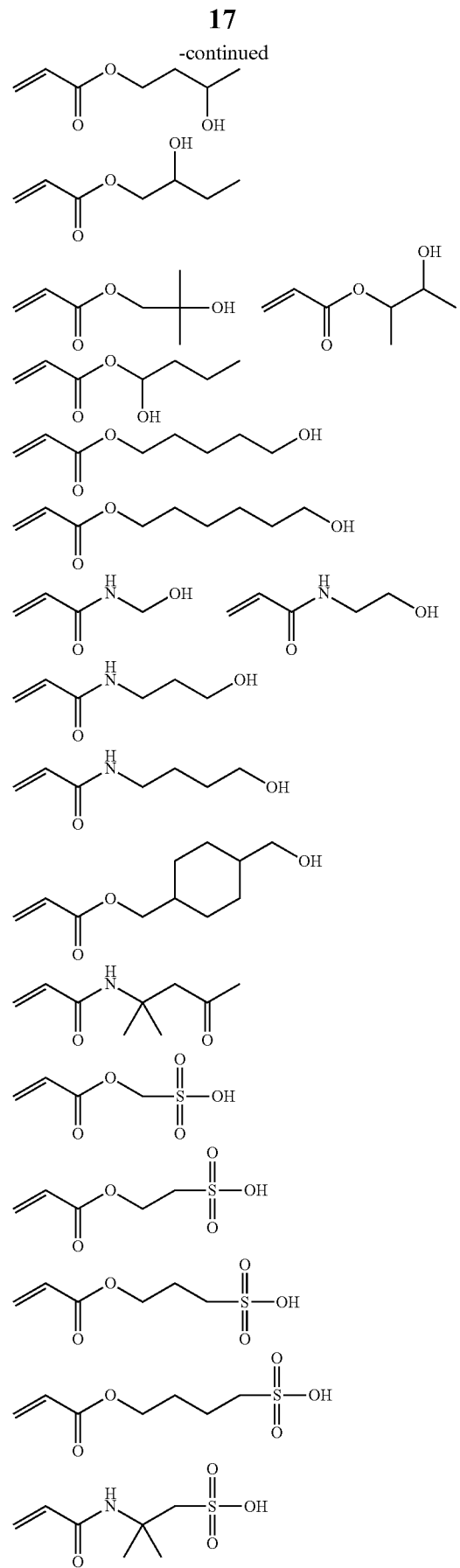
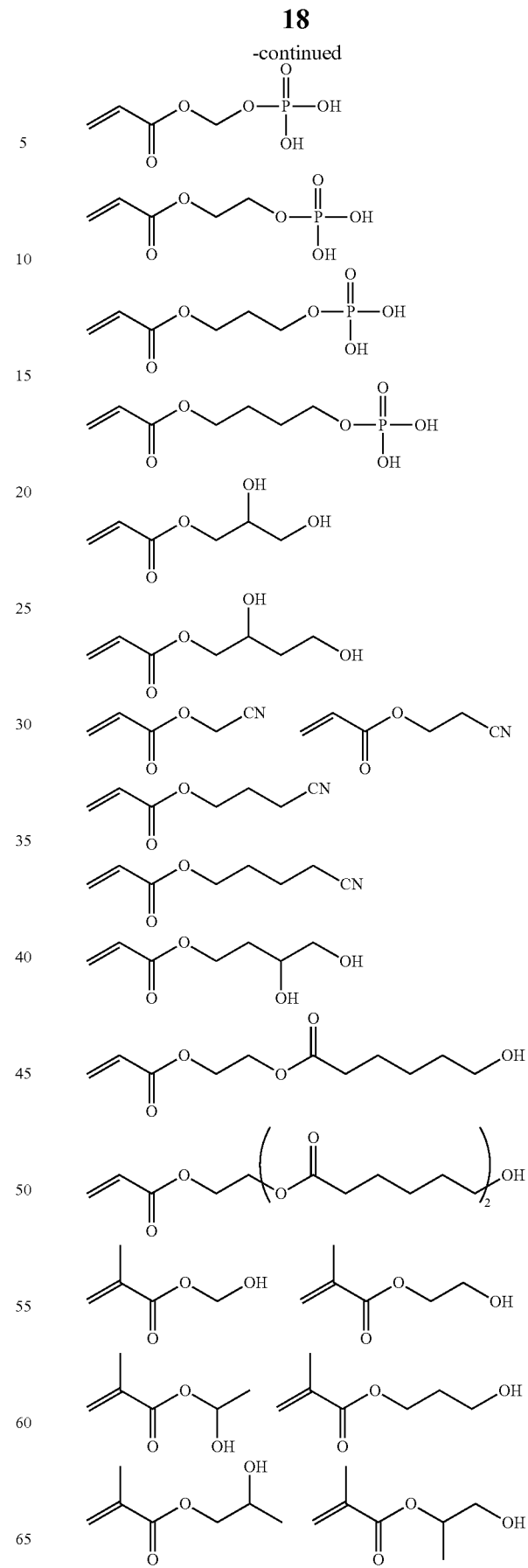

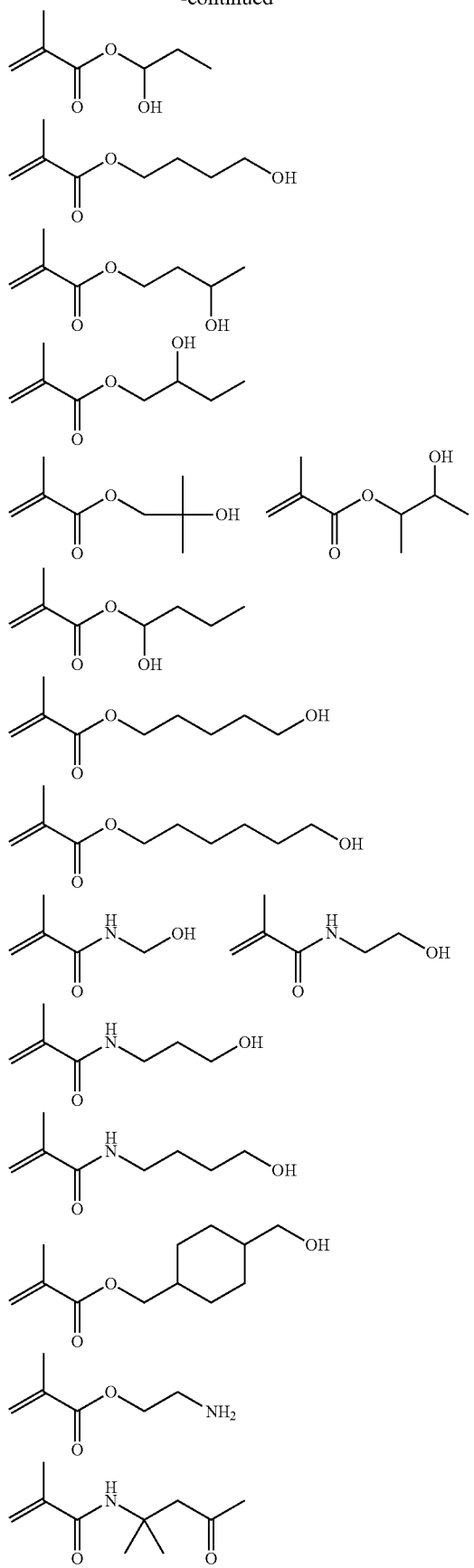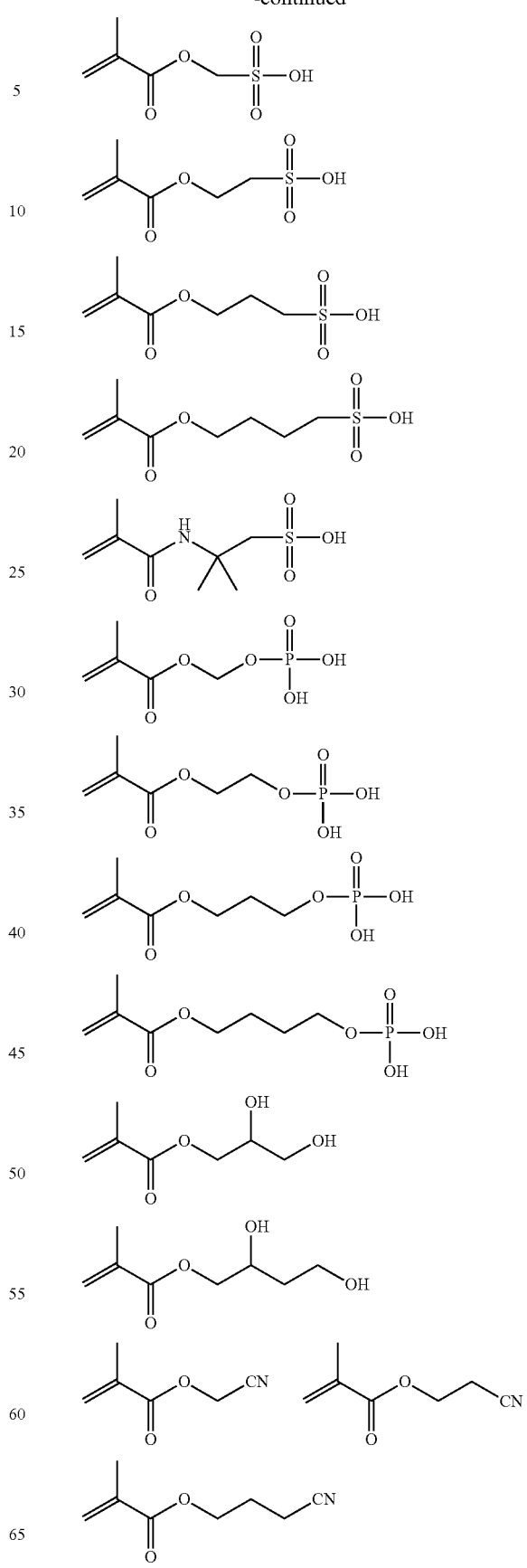

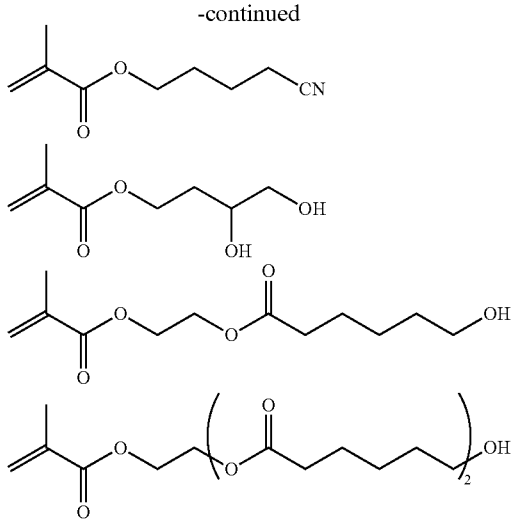

Among these specific examples, hydroxymethyl acrylate, 2-hydroxyethyl acrylate, 3-hydroxypropyl acrylate, 2-hydroxypropyl acrylate, 2-hydroxy-1-methylethyl acrylate, 4-hydroxybutyl acrylate, 2-hydroxybutyl acrylate, 2-(acryloyloxy)ethanesulfonic acid, 3-(acryloyloxy)ethanesulfonic acid, 2-(acryloyloxy)ethyl acid phosphate, 2,3-dihydroxypropyl acrylate, hydroxymethyl methacrylate, 2-hydroxyethyl methacrylate, 3-hydroxypropyl methacrylate, 2-hydroxypropyl methacrylate, 2-hydroxy-1-methylethyl methacrylate, 4-hydroxybutyl methacrylate, 2-hydroxybutyl methacrylate, 2-(methacryloyloxy)ethanesulfonic acid, 3-(methacryloyloxy)ethanesulfonic acid, 2-(methacryloyloxy)ethyl acid phosphate, and 2,3-dihydroxypropyl methacrylate are preferable.

More preferred specific examples of the monomer represented by the general formula [1] include a monomer represented by the following general formula [3].

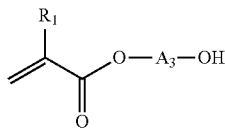

[3]

(In the general formula [3], $A_3$ represents a linear or branched alkylene group having 1 to 4 carbon atoms, and $R_1$ is as defined hereinbefore.)

$A_3$ of the general formula [3] is preferably a linear or branched alkylene group having 2 to 4 carbon atoms. Specific examples thereof include a methylene group, an ethylene group, a trimethylene group, a propylene group, a tetramethylene group, and an ethylethylene group, among which the ethylene group, the propylene group, and the tetramethylene group are preferable; and the ethylene group and the tetramethylene group are more preferable.

Specific examples of the monomer represented by the general formula [3] include hydroxymethyl acrylate, 2-hydroxyethyl acrylate, 3-hydroxypropyl acrylate, 2-hydroxypropyl acrylate, 2-hydroxy-1-methylethyl acrylate, 4-hydroxybutyl acrylate, 2-hydroxybutyl acrylate, hydroxymethyl methacrylate, 2-hydroxyethyl methacrylate, 3-hydroxypropyl methacrylate, 2-hydroxypropyl methacrylate, 2-hydroxy-1-methylethyl methacrylate, 4-hydroxybutyl methacrylate, and 2-hydroxybutyl methacrylate, among which 2-hydroxyethyl acrylate, 2-hydroxypropyl acrylate, 2-hydroxy-1-methylethyl acrylate, 4-hydroxybutyl acrylate, 2-hydroxyethyl methacrylate, 2-hydroxypropyl methacrylate, 2-hydroxy-1-methylethyl methacrylate, and 4-hydroxybutyl methacrylate are preferable; 2-hydroxyethyl acrylate, 2-hydroxypropyl acrylate, 2-hydroxy-1-methylethyl acrylate, and 4-hydroxybutyl acrylate are more preferable; and 2-hydroxyethyl acrylate and 4-hydroxybutyl acrylate are particularly preferable.

It should be noted that the monomer of (ii) may be used alone or in combination of two or more thereof, and it is preferable to use only one thereof alone or two thereof in combination.

The content ratio (molar ratio) of the structural unit derived from the monomer of (i) to the structural unit derived from the monomer of (ii) in the polymer according to the first invention is usually the monomer of (i):the monomer of (ii)=5:95 to 95:5, preferably 10:90 to 90:10, and more preferably 15:85 to 85:15. It should be noted that, in a case where two or more types of the monomer of (i) and/or the monomer of (ii) are used in combination, a ratio of the total number of moles of the structural unit derived from the monomer of (i) to the total number of moles of the structural unit derived from the monomer of (ii) may be the above-mentioned content ratio.

The polymer according to the first invention may further contain a structural unit derived from (iii) a monomer having two or more polymerizable unsaturated groups, in addition to the monomer of (i) and the monomer of (ii).

The (iii) monomer having two or more polymerizable unsaturated groups (hereinafter, sometimes referred to simply as the monomer of (iii)) has a structure different from that of the monomer of (i) and the monomer of (ii).

Specific examples of the polymerizable unsaturated group in the monomer of (iii) include an ethylenically unsaturated group such as a vinyloxy group, an allyl group, a vinylaryl group, an acryloyl group, or a methacryloyl group; an isocyanate group; and a carbodiimide group, among which the ethylenically unsaturated group is preferable; the allyl group, the acryloyl group, and the methacryloyl group are more preferable; and the acryloyl group is particularly preferable.

Examples of the monomer of (iii) include a monomer represented by the following general formula [11] or [12], among which a monomer represented by the general formula [11] is preferable.

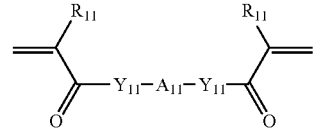

[11]

{In the general formula [11], $R_{11}$ represents a hydrogen atom or a methyl group, $Y_{11}$ represents —O— or —$NR_{12}$—, $R_{12}$ represents a hydrogen atom or a methyl group, Au represents a group represented by the following general formulae [11-1] to [11-3], and two $R_{11}$'s and two $Y_{11}$'s are each the same:

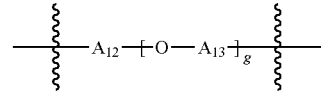

[11-1]

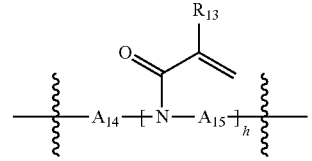

[11-2]

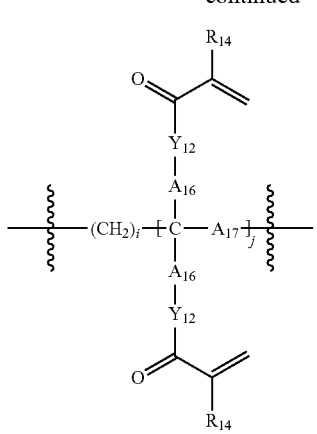

[11-3]

(In the general formulae [11-1] to [11-3], $R_{13}$ and $R_{14}$ each independently represent a hydrogen atom or a methyl group, $Y_{12}$ represents —O— or —$NR_{15}$—, $R_{15}$ represents a hydrogen atom or a methyl group, $A_{12}$ to $A_{15}$ each independently represent an alkylene group having 1 to 6 carbon atoms, $A_{16}$ and $A_{17}$ each independently represent an alkylene group having 1 to 6 carbon atoms which may have an ether bond in a chain thereof, g represents an integer of 0 to 30, h represents an integer of 1 to 3, i represents an integer of 0 to 6, j represents an integer of 1 to 3, and two $A_{16}$'s, two $R_{14}$'s, and two $Y_{12}$'s are each the same.).}

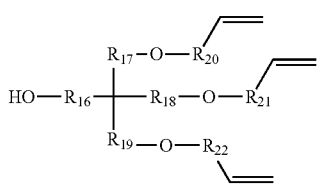

[12]

(In the general formula [12], $R_{16}$ to $R_{22}$ each independently represent an alkylene group having 1 to 3 carbon atoms.)

$R_{11}$ of the general formula [11] is preferably a hydrogen atom.

In $Y_{11}$ of the general formula [11], $R_{12}$ in —$NR_{12}$— is preferably a hydrogen atom.

$Y_{11}$ of the general formula [11] is preferably —O— or —NH— and more preferably —NH—.

The alkylene group having 1 to 6 carbon atoms in $A_{12}$ and $A_{13}$ of the general formula [11-1] is preferably an alkylene group having 1 to 4 carbon atoms and more preferably an alkylene group having 2 to 3 carbon atoms. In addition, the alkylene group may be linear, branched, or cyclic, and is preferably linear or branched and more preferably linear. Specific examples of the alkylene group include a methylene group, an ethylene group, a methylmethylene group, a trimethylene group, a propylene group, an ethylmethylene group, a dimethylmethylene group, a tetramethylene group, a 1-methyltrimethylene group, a 2-methyltrimethylene group, a 1,1-dimethylethylene group, a 1,2-dimethylethylene group, an ethylethylene group, a propylmethylene group, an ethylmethylmethylene group, a pentamethylene group, a 1-methyltetramethylene group, a 1-ethyltrimethylene group, an n-propylethylene group, an n-butylmethylene group, a hexamethylene group, a 1-methylpentamethylene group, a 1-ethyltetramethylene group, a 1-n-propyltrimethylene group, an n-butylethylene group, an n-pentylmethylene group, and a —$C_6H_{10}$— group, among which a linear or branched alkylene group having 1 to 4 carbon atoms is preferable; and a methylene group, an ethylene group, a trimethylene group, a propylene group, and a tetramethylene group are more preferable.

In g pieces of repeating units in the general formula [11-1], the repeating units may be the same or different. It is preferable that all the repeating units are the same. In addition, g pieces of $A_{13}$'s in the general formula [11-1] may be the same or different. In a case where g in the general formula [11-1] is an integer of 1 or more, it is preferable that $A_{12}$ and $A_{13}$ in the g-th repeating unit are the same; and it is more preferable that $A_{12}$ and $A_{13}$ in the g-th repeating unit are the same, and $A_{13}$'s in the first to g–1-th repeating units are all the same. It should be noted that the repeating unit in the general formula [11-1] is counted as the first repeating unit, the second repeating unit, . . . from the side adjacent to $A_{12}$, and the g-th repeating unit is a repeating unit located at the farthest point from $A_{12}$ (a repeating unit adjacent to one of $Y_1$'s in the general formula [11]).

g of the general formula [11-1] is preferably an integer of 0 to 15, more preferably an integer of 0 to 10, and still more preferably an integer of 0 to 3.

Examples of the combination of $A_{12}$, $A_{13}$, and g in the general formula [111-1] include combinations 1 to 29 described in the following table. Among these combinations, combinations 1, 2, 7 to 13, 15, 17 to 19, 24, and 25 are preferable, and combinations 1, 7 to 10, 12, 15, 17, 18, and 24 are more preferable.

| Combination | $A_{12}$ | $A_{13}$ | g |
|---|---|---|---|
| 1 | Methylene group | (None) | 0 |
| 2 | Methylene group | Methylene group | 1 |
| 3 | Methylene group | Methylene groups in all of two repeating units | 2 |
| 4 | Methylene group | Ethylene group in first repeating unit and methylene group in second repeating unit | 2 |
| 5 | Methylene group | Methylene groups in all of three repeating units | 3 |
| 6 | Methylene group | Ethylene groups in first and second repeating units and methylene group in third repeating unit | 3 |
| 7 | Ethylene group | (None) | 0 |
| 8 | Ethylene group | Ethylene group | 1 |
| 9 | Ethylene group | Ethylene groups in all of two repeating units | 2 |
| 10 | Ethylene group | Ethylene groups in all of three repeating units | 3 |
| 11 | Ethylene group | Ethylene groups in all of d pieces of repeating units | 4~30 |
| 12 | Trimethylene group | (None) | 0 |
| 13 | Trimethylene group | Trimethylene group | 1 |
| 14 | Trimethylene group | Trimethylene groups in all of two repeating units | 2 |
| 15 | Trimethylene group | Ethylene group in first repeating unit and trimethylene group in second repeating unit | 2 |
| 16 | Trimethylene group | Trimethylene groups in all of three repeating units | 3 |
| 17 | Trimethylene group | Ethylene groups in first and second repeating units and trimethylene group in third repeating unit | 3 |
| 18 | Propylene group | (None) | 0 |
| 19 | Propylene group | Propylene group | 1 |
| 20 | Propylene group | Propylene groups in all of two repeating units | 2 |

| Combination | $A_{12}$ | $A_{13}$ | g |
|---|---|---|---|
| 21 | Propylene group | Ethylene group in first repeating unit and propylene group in second repeating unit | 2 |
| 22 | Propylene group | Propylene groups in all of three repeating units | 3 |
| 23 | Propylene group | Ethylene groups in first and second repeating units and propylene group in third repeating unit | 3 |
| 24 | Tetramethylene group | (None) | 0 |
| 25 | Tetramethylene group | Tetramethylene group | 1 |
| 26 | Tetramethylene group | Tetramethylene groups in all of two repeating units | 2 |
| 27 | Tetramethylene group | Ethylene group in first repeating unit and tetramethylene group in second repeating unit | 2 |
| 28 | Tetramethylene group | Tetramethylene groups in all of three repeating units | 3 |
| 29 | Tetramethylene group | Ethylene groups in first and second repeating units and tetramethylene group in third repeating unit | 3 |

In h pieces of repeating units in the general formula [11-2], the repeating units may be the same or different. It is preferable that all the repeating units are the same. In addition, h pieces of $R_{13}$'s in the general formula [11-2] may be the same or different. It is preferable that all $R_{13}$'s are the same, and it is more preferable that all $R_{13}$'s are the same as Rn's of the general formula [11].

Examples of the alkylene group having 1 to 6 carbon atoms in $A_{14}$ and $A_{15}$ of the general formula [11-2] include the same alkylene groups having 1 to 6 carbon atoms in $A_{12}$ and $A_{13}$ of the general formula [11-1], among which a linear alkylene group having 1 to 4 carbon atoms is preferable and an ethylene group is more preferable.

h pieces of $A_{15}$'s in the general formula [11-2] may be the same or different. It is preferable that all $A_{15}$'s are the same. In addition, it is preferable that $A_{14}$ of the general formula [11-2] and $A_{15}$ in the h-th repeating unit are the same, and it is more preferable that $A_{14}$ and $A_{15}$ in all repeating units are the same. It should be noted that the repeating unit in the general formula [11-2] is counted as the first repeating unit, the second repeating unit, ... from the side adjacent to $A_{14}$, and the h-th repeating unit is a repeating unit located at the farthest point from $A_{14}$ (a repeating unit adjacent to one of $Y_1$'s in the general formula [11]).

e of the general formula [11-2] is preferably 1 or 2.

Examples of the combination of $A_{14}$, $A_{15}$, $R_{13}$, and h in the general formula [11-2] include combinations 1 to 12 described in the following table. Among these combinations, combinations 4 to 6 are preferable and combinations 4 and 5 are more preferable.

| Combination | $A_{14}$ | $A_{15}$ | $R_{13}$ | h |
|---|---|---|---|---|
| 1 | Methylene group | Methylene groups in all of e pieces of repeating units | Hydrogen atoms in all of e pieces of repeating units or | 1 |
| 2 | Methylene group | | | 2 |
| 3 | Methylene group | | Methyl groups in all of e pieces of | 3 |
| 4 | Ethylene group | Ethylene groups in repeating units | | 1 |
| 5 | Ethylene group | all of e pieces of | | 2 |
| 6 | Ethylene group | repeating units | | 3 |
| 7 | Trimethylene group | Trimethylene groups in all of e | | 1 |
| 8 | Trimethylene group | pieces of repeating units | | 2 |
| 9 | Trimethylene group | | | 3 |
| 10 | Tetramethylene group | Tetramethylene groups in all of e | | 1 |
| 11 | Tetramethylene group | pieces of repeating units | | 2 |
| 12 | Tetramethylene group | | | 3 |

In j pieces of repeating units in the general formula [11-3], the repeating units may be the same or different. It is preferable that all the repeating units are the same. In addition, 2j pieces of $R_{14}$'s in the general formula [11-3] may be the same or different. It is preferable that all $R_{14}$'s are the same, and it is more preferable that all $R_{14}$'s are the same as Rn's of the general formula [11]. In this regard, two $R_{14}$'s existing in the same repeating unit are always the same.

In $Y_{12}$ of the general formula [11-3], $R_{15}$ in $-NR_{15}-$ is preferably a hydrogen atom.

2j pieces of $Y_{12}$'s in the general formula [11-3] may be the same or different. It is preferable that all $Y_{12}$'s are the same, and it is more preferable that all $Y_{12}$'s are the same as $Y_{11}$'s of the general formula [11]. In this regard, two $Y_{12}$'s existing in the same repeating unit are always the same.

Specific examples of the case where the "alkylene group having 1 to 6 carbon atoms which may have an ether bond in a chain thereof" in $A_{16}$ and $A_{17}$ of the general formula [11-3] does not have an ether bond include the same alkylene groups having 1 to 6 carbon atoms in $A_{12}$ and $A_{13}$ of the general formula [11-1], among which a linear alkylene group having 1 to 4 carbon atoms is preferable and a methylene group is more preferable.

Specific examples of the case where the "alkylene group having 1 to 6 carbon atoms which may have an ether bond in a chain thereof" in $A_{16}$ and $A_{17}$ of the general formula [11-3] has an ether bond include $-CH_2-O-CH_2-$, $-CH_2-O-(CH_2)_2-$, $-CH_2-O-(CH_2)_3-$, $-CH_2-O-(CH_2)_4-$, $-CH_2-O-(CH_2)_5-$, $-(CH_2)_2-O-CH_2-$, $-(CH_2)_2-O-(CH_2)_2-$, $-(CH_2)_2-O-(CH_2)_3-$, $-(CH_2)_2-O-(CH_2)_4-$, $-(CH_2)_3-O-CH_2-$, $-(CH_2)_3-O-(CH_2)_2-$, $-(CH_2)_3-O-(CH_2)_3-$, $-(CH_2)_4-O-CH_2-$, $-(CH_2)_4-O-(CH_2)_2-$, and $-(CH_2)_5-O-CH_2-$, among which a linear alkylene group having 2 to 4 carbon atoms and having an ether bond in a chain thereof is preferable, and $-CH_2-O-CH_2-$ or $-CH_2-O-(CH_2)_3-$ is more preferable.

2j pieces of $A_{16}$'s and j pieces of $A_{17}$'s in the general formula [11-3] may be respectively the same or different. In this regard, two $A_{16}$'s existing in the same repeating unit are always the same. In addition, it is preferable that all $A_{16}$'s of the general formula [11-3] and $A_{17}$ in the i-th repeating unit are the same. It should be noted that the repeating unit in the general formula [11-3] is counted as the first repeating unit, the second repeating unit, ... from the side adjacent to $-(CH_2)_i-$, and the j-th repeating unit is a repeating unit located at the farthest point from $-(CH_2)_i-$ (a repeating unit adjacent to one of $Y_1$'s in the general formula [11]).

i of the general formula [11-3] is preferably an integer of 0 to 4, more preferably 0 or 1, and still more preferably 0.

j of the general formula [11-3] is preferably 1 or 2 and more preferably 1.

Examples of the combination of two $A_{16}$'s, $A_{17}$, two $Y_{12}$'s, two $R_{14}$'s, i, and j in the general formula [11-3] include combinations 1 to 20 described in the following table. Among these combinations, combinations 1 to 6 and 11 to 16 are preferable, combinations 1, 2, 11, 12, 13, and 14 are more preferable, and combinations 1, 11, and 13 are particularly preferable. It should be noted that "—$CH_2$—O—$(CH_2)_3$—" in the two $A_{16}$'s is such that a left end thereof is bonded to a main chain and a right end thereof is bonded to $Y_{12}$.

| Combination | Two A16's | $A_{17}$ | Two Y12's | Two R14's | i | j |
|---|---|---|---|---|---|---|
| 1 | Methylene group | Methylene group | —O— | Hydrogen | 1 | 1 |
| 2 | Ethylene group | Ethylene group | —O— | atoms in all | 2 | 1 |
| 3 | Trimethylene group | Trimethylene group | —O— | of g pieces of | 3 | 1 |
| 4 | Tetramethylene group | Tetramethylene group | —O— | repeating | 4 | 1 |
| 5 | —$CH_2$—O—$(CH_2)_3$— | —$CH_2$—O—$(CH_2)_3$— | —O— | units | 0 | 1 |
| 6 | —$CH_2$—O—$(CH_2)_3$— | —$CH_2$—O—$(CH_2)_3$— | —O— | or | 1 | 1 |
| 7 | Methylene group | Methylene group | —NH— | methyl | 1 | 1 |
| 8 | Ethylene group | Ethylene group | —NH— | groups in all | 2 | 1 |
| 9 | Trimethylene group | Trimethylene group | —NH— | of g pieces of | 3 | 1 |
| 10 | Tetramethylene group | Tetramethylene group | —NH— | repeating | 4 | 1 |
| 11 | —$CH_2$—O—$(CH_2)_3$— | —$CH_2$—O—$(CH_2)_3$— | —NH— | units | 0 | 1 |
| 12 | —$CH_2$—O—$(CH_2)_3$— | —$CH_2$—O—$(CH_2)_3$— | —NH— | | 1 | 1 |
| 13 | Methylene group | —CH2—O—CH2— in first repeating unit and methylene group in second repeating unit | —O— in all of two repeating units | | 1 | 2 |
| 14 | Ethylene group | —CH2—O—CH2— in first repeating unit and ethylene group in second repeating unit | | | 2 | 2 |
| 15 | Trimethylene group | —CH2—O—CH2— in first repeating unit and trimethylene group in second repeating unit | | | 3 | 2 |
| 16 | Tetramethylene group | —CH2—O —CH2— in first repeating unit and tetramethylene group in second repeating unit | | | 4 | 2 |
| 17 | Methylene group | —CH2—O—CH2— in first repeating unit and methylene group in second repeating unit | —NH— in all of two repeating units | | 1 | 2 |
| 18 | Ethylene group | —CH2—O—CH2— in first repeating unit and ethylene group in second repeating unit | | | 2 | 2 |
| 19 | Trimethylene group | —CH2—O—CH2— in first repeating unit and trimethylene group in second repeating unit | | | 3 | 2 |
| 20 | Tetramethylene group | —CH2—O—CH2— in first repeating unit and tetramethylene group in second repeating unit | | | 4 | 2 |

Examples of the combination of $A_{11}$, two $Y_{11}$'s, and two $R_{11}$'s in the general formula [11] include combinations 1 to 14 described in the following table.

| Combination | $A_{11}$ | Two Y11's | Two R11's |
|---|---|---|---|
| 1 | Combinations 1 to 29 of groups represented by general formula [11-1] | —O— | Hydrogen atom |
| 2 | | —O— | Methyl group |
| 3 | | —NH— | Hydrogen atom |
| 4 | | —NH— | Methyl group |
| 5 | Combinations 1 to 12 of groups represented by general formula [11-2] | —NH— | Hydrogen atom |
| 6 | | —NH— | Methyl group |
| 7 | Combinations 1 to 6 of groups represented by general formula [11-3] | —O— | Hydrogen atom |
| 8 | | —O— | Methyl group |
| 9 | Combinations 7 to 12 of groups represented by general formula [11-3] | —NH— | Hydrogen atom |
| 10 | | —NH— | Methyl group |
| 11 | Combinations 13 to 16 of groups represented by general formula [11-3] | —O— | Hydrogen atom |
| 12 | | —O— | Methyl group |
| 13 | Combinations 17 to 20 of groups represented by general formula [11-3] | —NH— | Hydrogen atom |
| 14 | | —NH— | Methyl group |

The alkylene group having 1 to 3 carbon atoms in $R_{16}$ to $R_{22}$ of the general formula [12] may be linear or branched and is preferably linear. Specific examples thereof include a methylene group, an ethylene group, a methylmethylene group, a trimethylene group, a propylene group, an ethylmethylene group, and a dimethylmethylene group, among which the methylene group, the ethylene group, or the trimethylene group is preferable; the methylene group or the trimethylene group is more preferable; and the methylene group is particularly preferable.

$R_{16}$ to $R_{22}$ of the general formula [12] may be the same or different. It is preferable that $R_{17}$ to $R_{19}$ and $R_{20}$ to $R_{22}$ are respectively the same, and it is preferable that all of $R_{16}$ to $R_{22}$ are the same.

Examples of the combination of $R_{16}$ to $R_{22}$ in the general formula [12] include combinations 1 to 27 described in the following table. Among these combinations, combinations 1 to 3 are preferable, combinations 1 and 3 are more preferable, and combination 1 is particularly preferable.

| Combination | $R_{16}$ | $R_{17}$ to $R_{19}$ | $R_{20}$ to $R_{22}$ |
|---|---|---|---|
| 1 | Methylene group | Methylene group for all | Methylene group for all |
| 2 | Methylene group | Methylene group for all | Ethylene group for all |
| 3 | Methylene group | Methylene group for all | Trimethylene group for all |
| 4 | Methylene group | Ethylene group for all | Methylene group for all |
| 5 | Methylene group | Ethylene group for all | Ethylene group for all |
| 6 | Methylene group | Ethylene group for all | Trimethylene group for all |
| 7 | Methylene group | Trimethylene group for all | Methylene group for all |
| 8 | Methylene group | Trimethylene group for all | Ethylene group for all |
| 9 | Methylene group | Trimethylene group for all | Trimethylene group for all |
| 10 | Ethylene group | Methylene group for all | Methylene group for all |
| 11 | Ethylene group | Methylene group for all | Ethylene group for all |
| 12 | Ethylene group | Methylene group for all | Trimethylene group for all |

-continued

| Combination | $R_{16}$ | $R_{17}$ to $R_{19}$ | $R_{20}$ to $R_{22}$ |
|---|---|---|---|
| 13 | Ethylene group | Ethylene group for all | Methylene group for all |
| 14 | Ethylene group | Ethylene group for all | Ethylene group for all |
| 15 | Ethylene group | Ethylene group for all | Trimethylene group for all |
| 16 | Ethylene group | Trimethylene group for all | Methylene group for all |
| 17 | Ethylene group | Trimethylene group for all | Ethylene group for all |
| 18 | Ethylene group | Trimethylene group for all | Trimethylene group for all |
| 19 | Trimethylene group | Methylene group for all | Methylene group for all |
| 20 | Trimethylene group | Methylene group for all | Ethylene group for all |
| 21 | Trimethylene group | Methylene group for all | Trimethylene group for all |
| 22 | Trimethylene group | Ethylene group for all | Methylene group for all |
| 23 | Trimethylene group | Ethylene group for all | Ethylene group for all |
| 24 | Trimethylene group | Ethylene group for all | Trimethylene group for all |
| 25 | Trimethylene group | Trimethylene group for all | Methylene group for all |
| 26 | Trimethylene group | Trimethylene group for all | Ethylene group for all |
| 27 | Trimethylene group | Trimethylene group for all | Trimethylene group for all |

Specific examples of the monomers represented by the general formulae [11] and [12] include the following monomers.

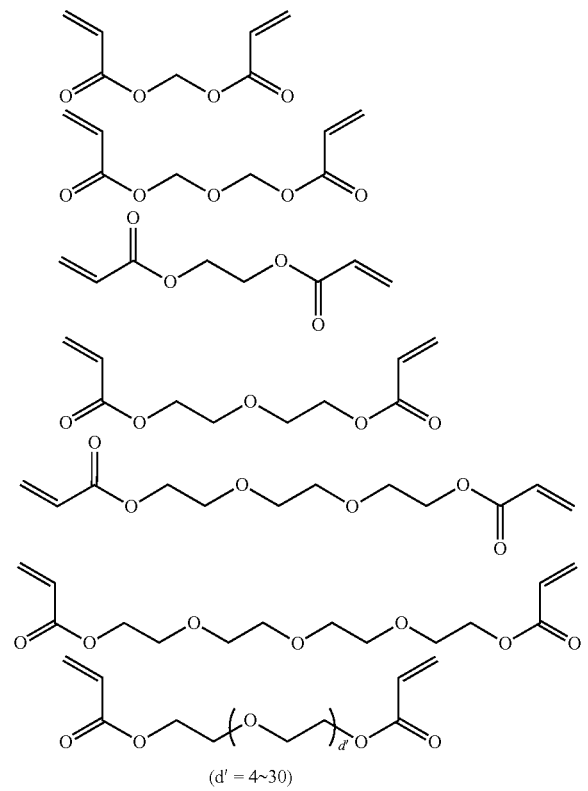

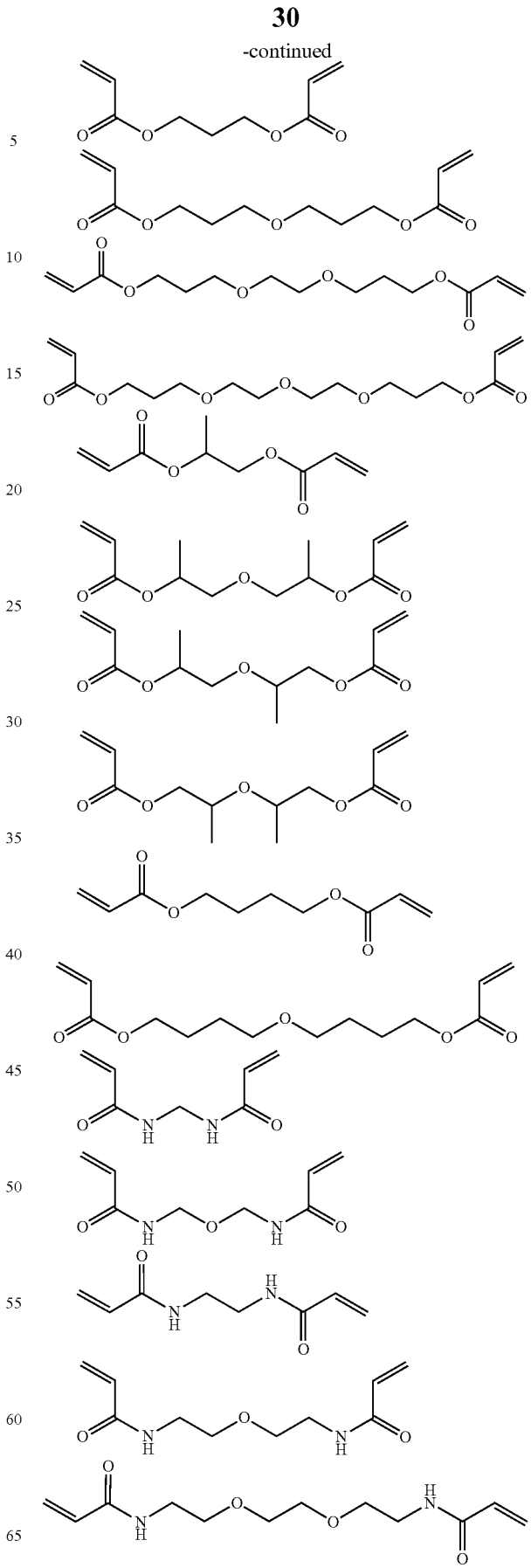

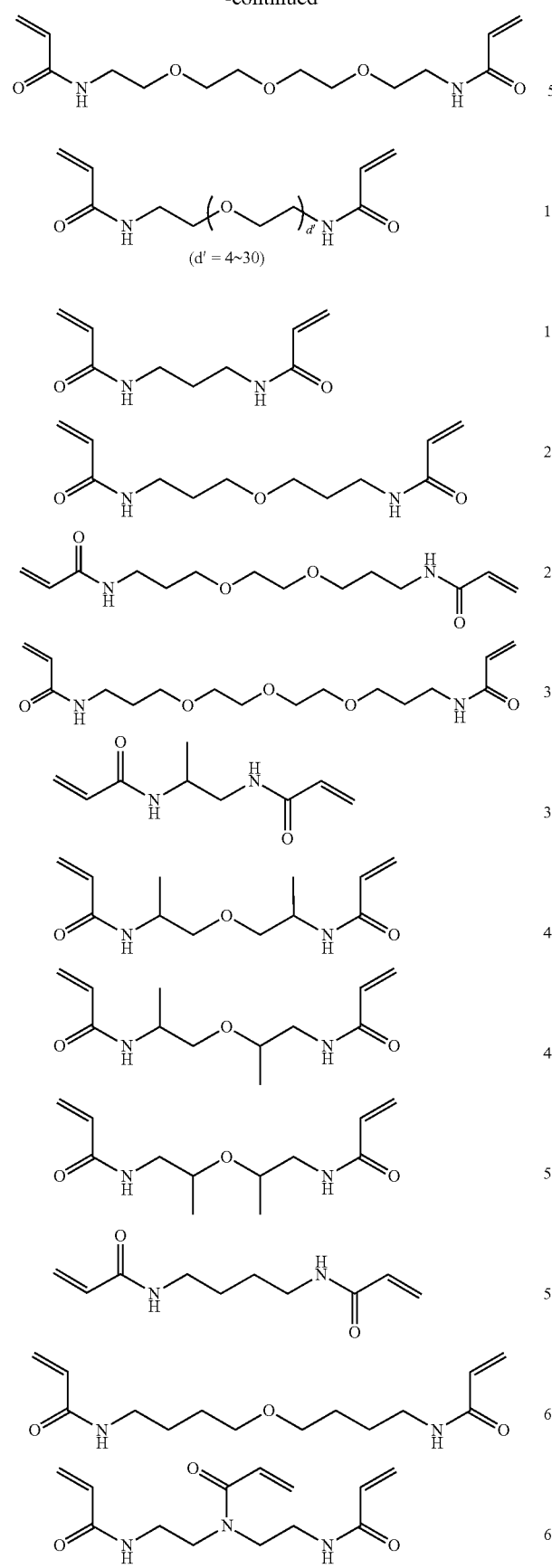
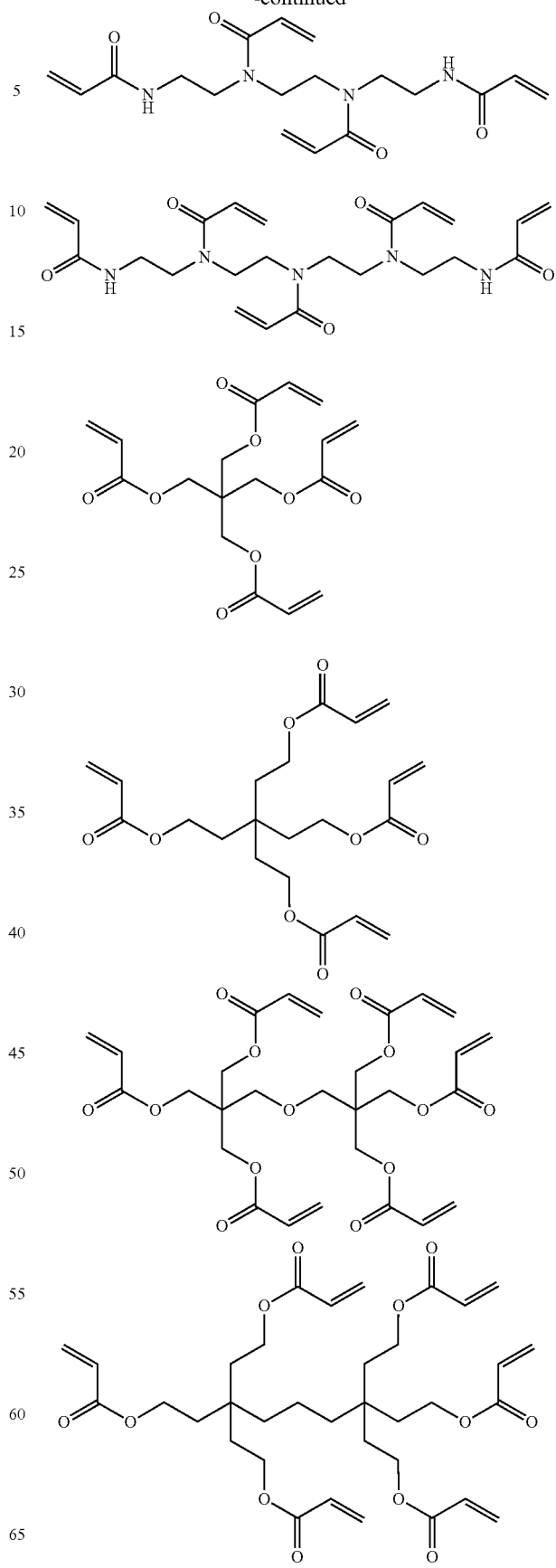

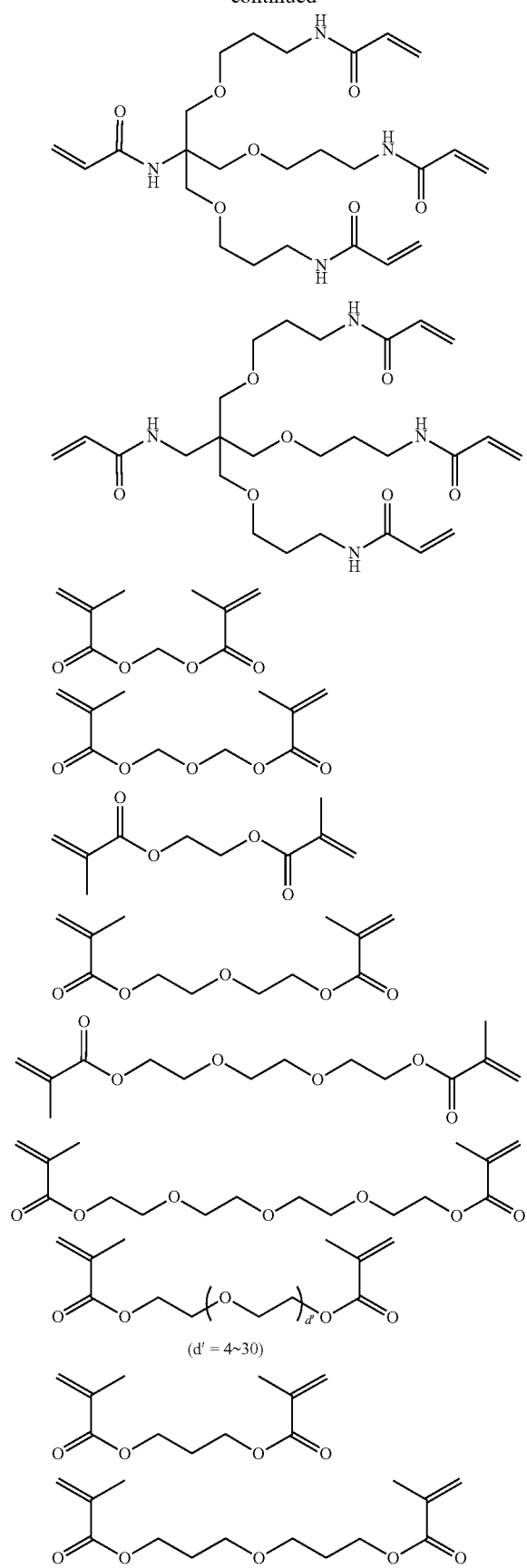
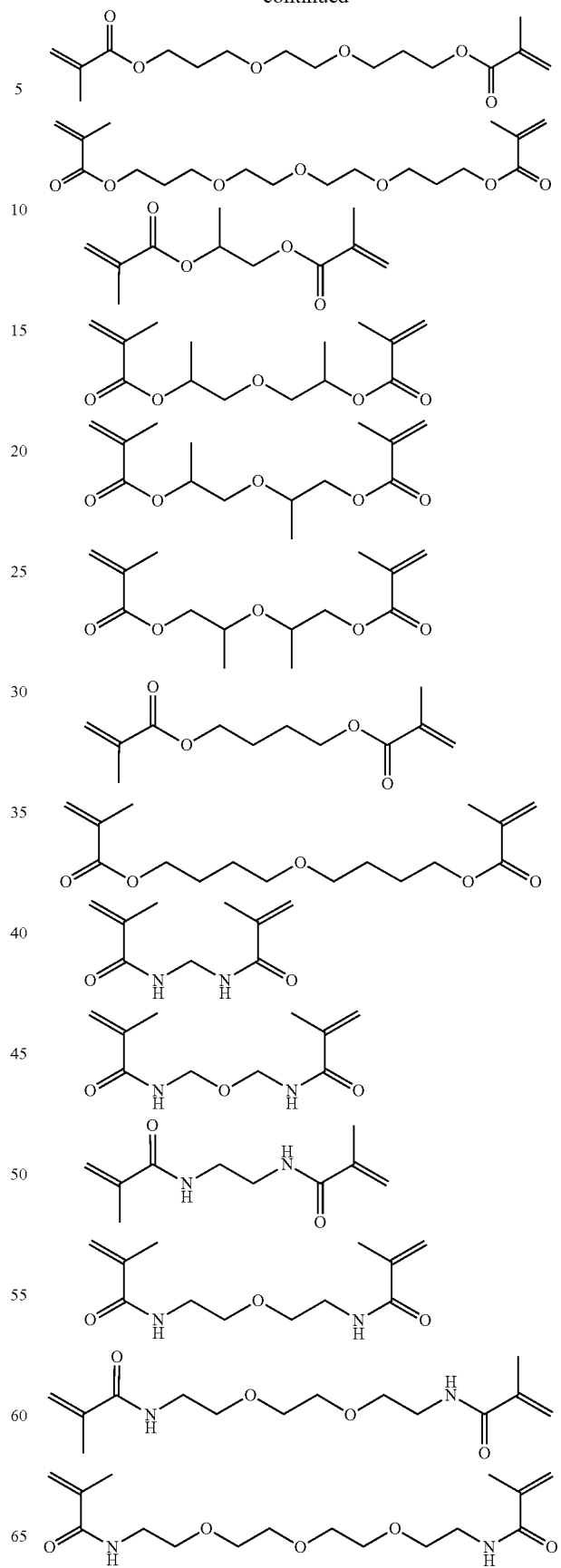

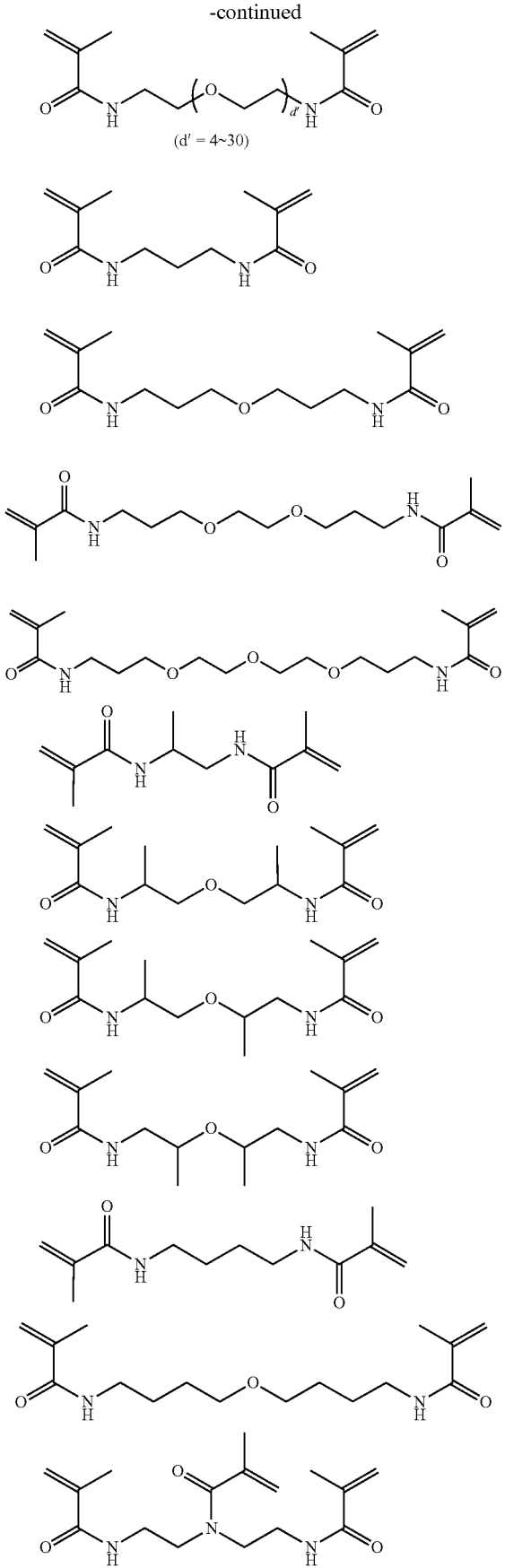
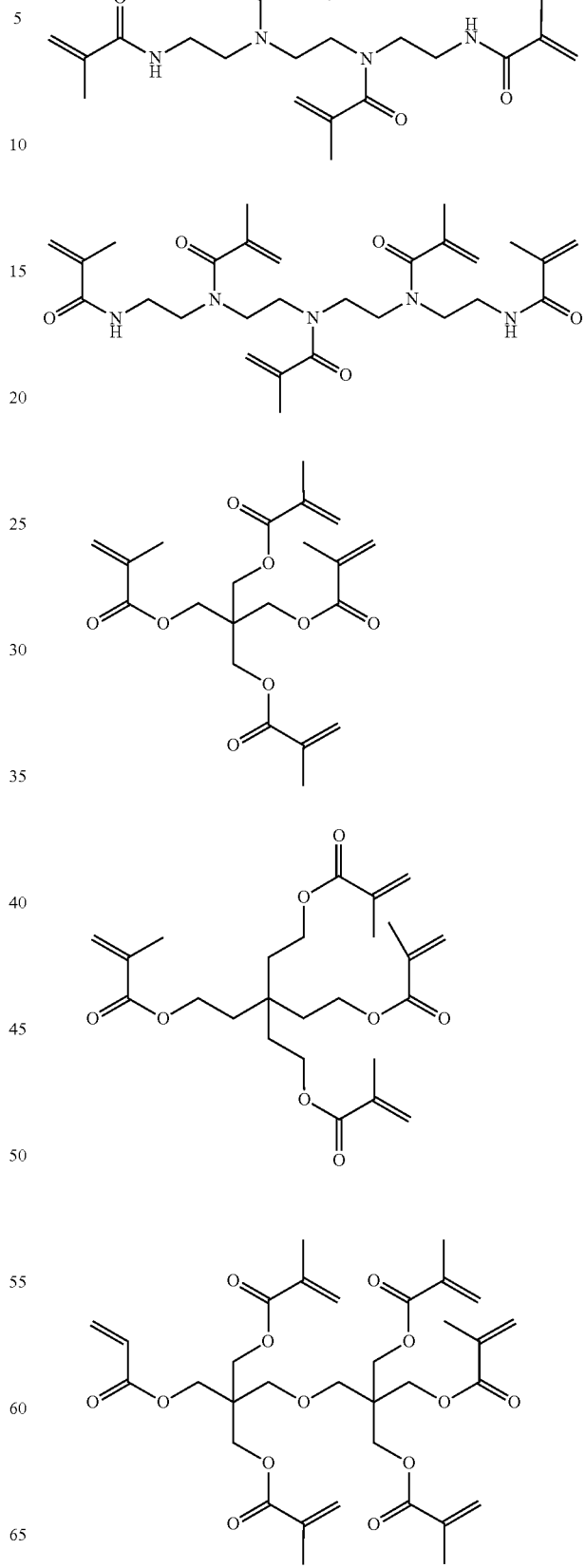

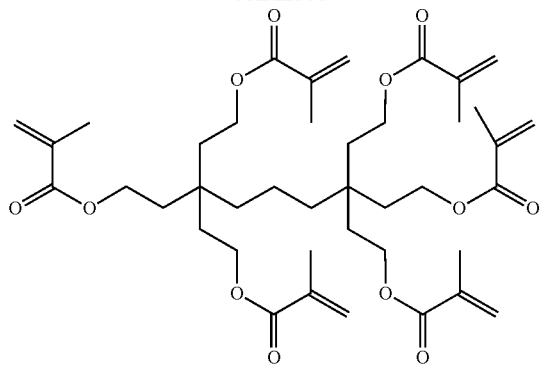
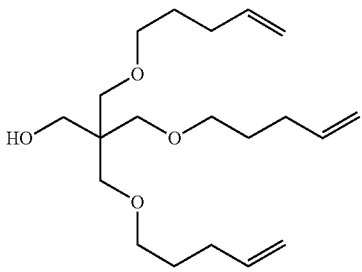
Among the above specific examples, the following monomers are preferable.
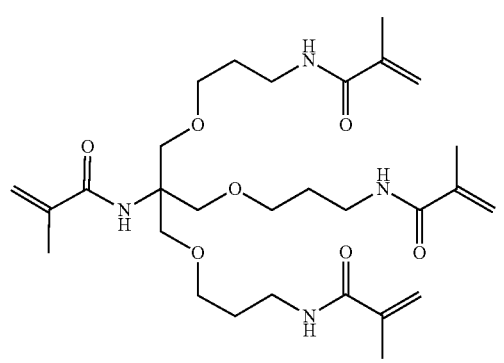
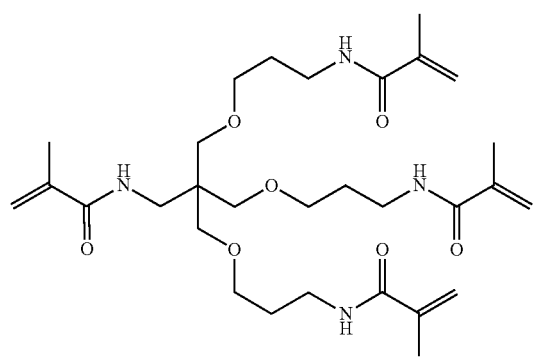
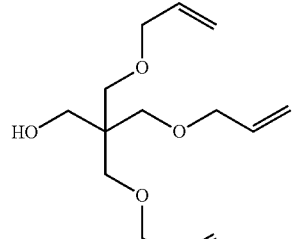
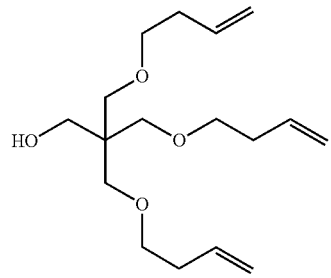

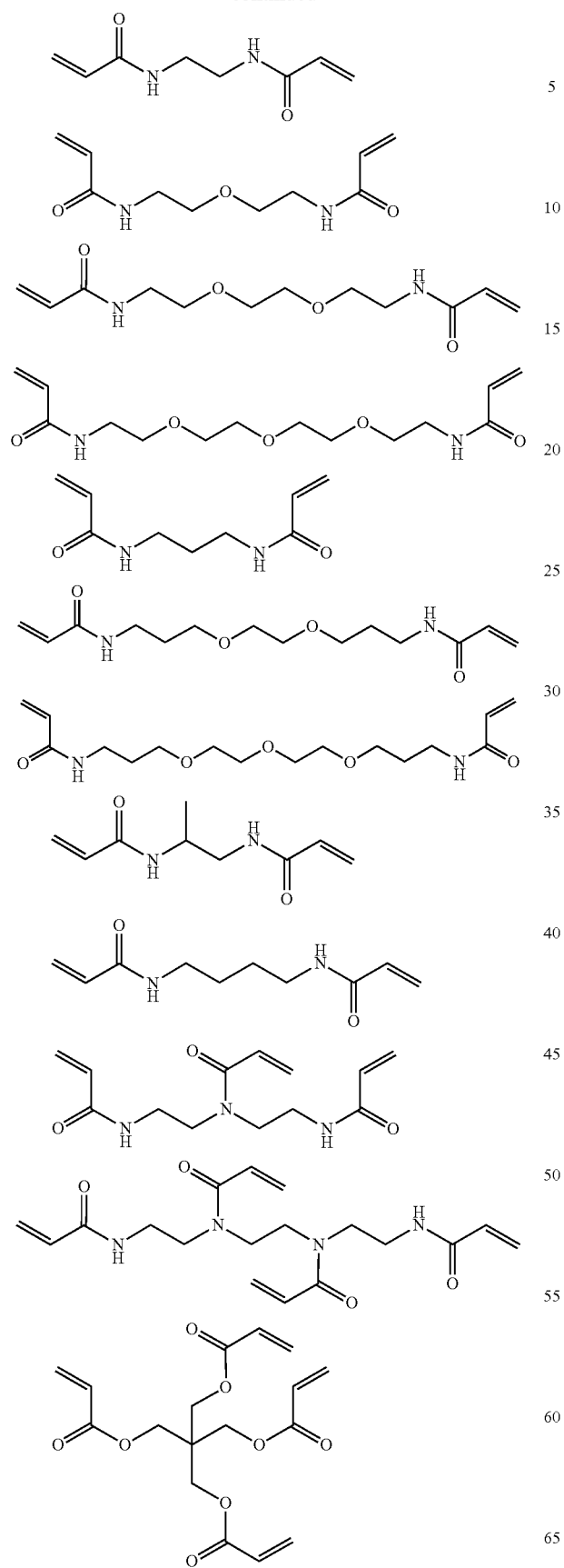
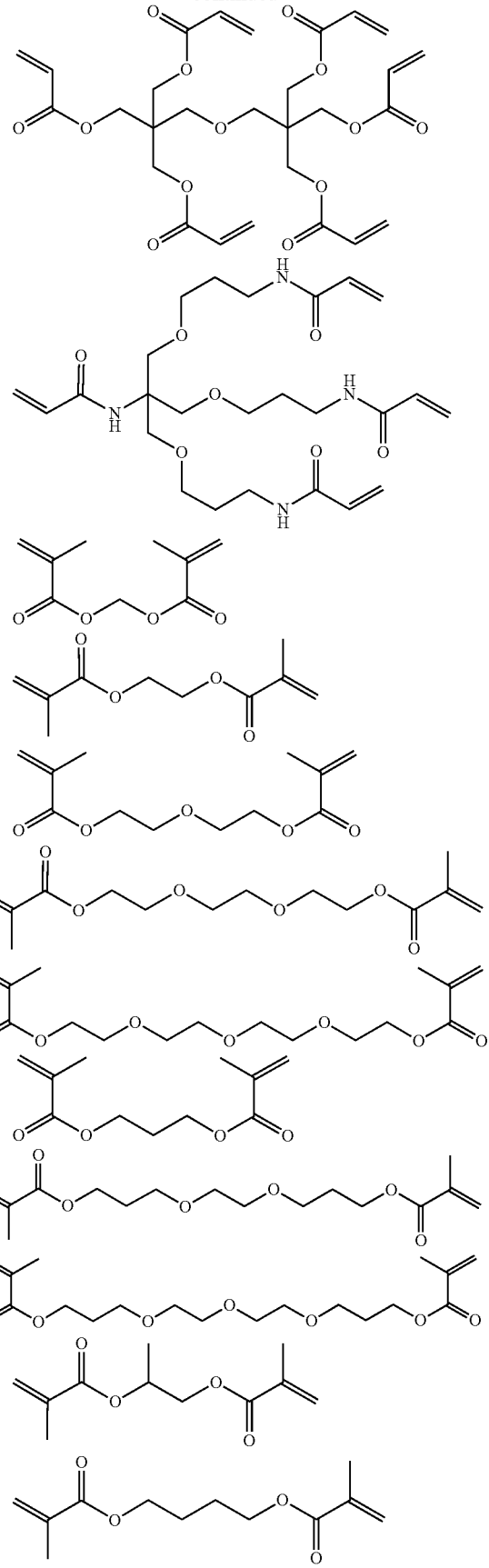

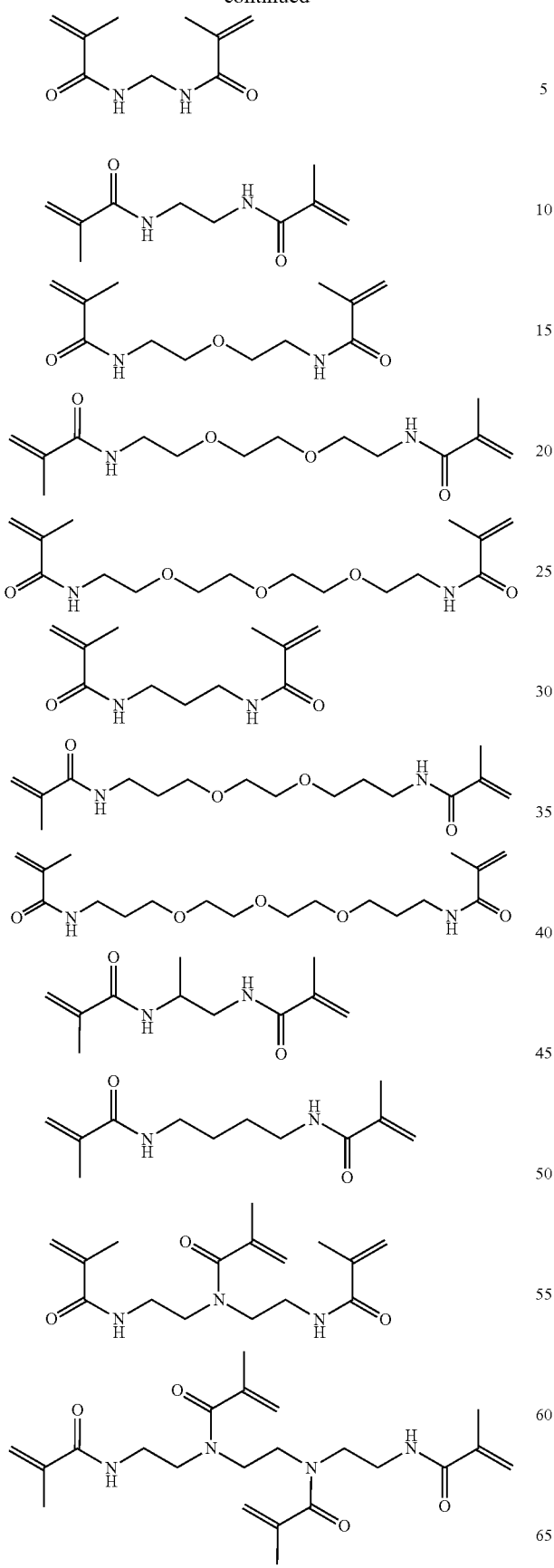
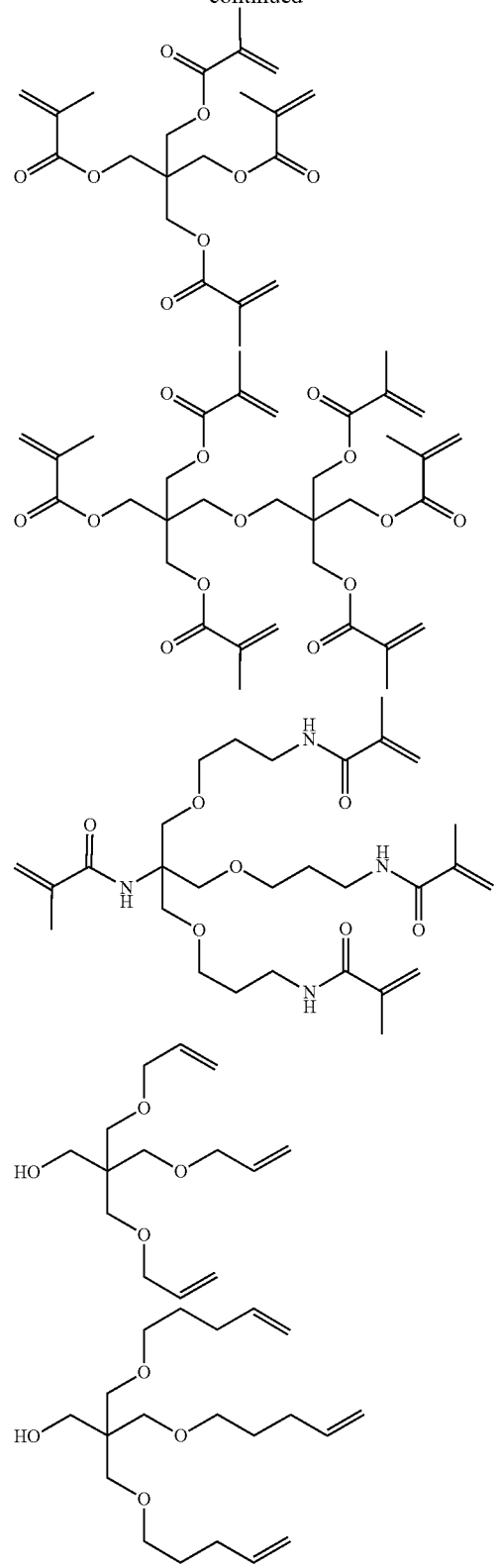
Among the above preferred specific examples, methylene diacrylate, ethylene glycol diacrylate, diethylene glycol diacrylate, triethylene glycol diacrylate, tetraethylene glycol diacrylate, trimethylene diacrylate, propylene diacrylate, tetramethylene diacrylate, N,N'-methylene bisacrylamide, N,N'-ethylene bisacrylamide, N,N'-(4,7,10-trioxytridecamethylene)bisacrylamide, N,N',N''-triacryloyldiethylenetriamine, N,N',N'',N'''-tetraacryloyltriethylenetetramine, N-[tris(3-acrylamidepropoxymethyl)methyl]acrylamide, methylene dimethacrylate, ethylene glycol dimethacrylate, diethylene glycol dimethacrylate, triethylene glycol dimethacrylate, tetraethylene glycol dimethacrylate, trimethylene dimethacrylate, propylene dimethacrylate, tetramethylene dimethacrylate, N,N'-methylenebismethacrylamide, N,N'-ethylenebismethacrylamide, N,N'-(4,7,10-trioxytridecamethylene)bismethacrylamide, N,N',N''-trimethacryloyldiethylenetriamine, N,N',N'',N'''-tetramethacryloyltriethylenetetramine, N-[tris(3-methacrylamidepropoxymethyl)methyl]methacrylamide, and pentaerythritol triallyl ether are more preferable. It should be noted that these more preferred specific examples will be referred to as "a more preferred specific example group of the monomer of (iii)".

As the monomer of (iii), monomers generally used as a "crosslinking agent" in the art can be appropriately used in addition to the specific examples. For example, the crosslinking agents described in WO2014/065407A, WO2015/163302A, WO2018/143382A, WO2018/143383A, and the like can be used.

In a case where the polymer according to the first invention contains a structural unit derived from the monomer of (iii), the content thereof is usually 0.01 mol % or more and 5 mol % or less, preferably 0.05 mol % or more and 2 mol % or less, and more preferably 0.1 mol % or more and 1 mol % or less with respect to the total content of the structural units derived from the monomer of (i) and the monomer of (ii).

The monomer of (i), the monomer of (ii), and the monomer of (iii) may all be commercially available or appropriately synthesized by a method known per se.

The polymer according to the first invention may appropriately contain a structural unit derived from a monomer commonly used in the art (hereinafter, sometimes referred to simply as another monomer), in addition to the monomer of (i), the monomer of (ii), and the monomer of (iii). In a case where the polymer according to the first invention contains a structural unit derived from the another monomer, the content thereof is usually 0.01 mol % or more and 5 mol % or less, preferably 0.05 mol % or more and 2 mol % or less, and more preferably 0.1 mol % or more and 1 mol % or less with respect to the total content of the structural units derived from the monomer of (i) and the monomer of (ii).

In addition, the polymer according to the first invention may contain two or more structural units derived from the monomer of (i), the monomer of (ii), and the monomer of (iii), respectively.

The polymer according to the first invention is preferably a polymer consisting of structural units derived from one monomer of (i) and one or two monomers of (ii), or a polymer consisting of structural units derived from one monomer of (i), one or two monomers of (ii), and one monomer of (iii); and more preferably a polymer consisting of structural units derived from one monomer of (i), and one or two monomers of (ii) having a solubility in water at 20° C. of 1 g/L or more, a polymer consisting of structural units derived from one monomer of (i), and one or two monomers of (ii) having an SP value of 11.5 $(cal/cm^3)^{1/2}$ or more, a polymer consisting of structural units derived from one monomer of (i), one or two monomers of (ii) having a solubility in water at 20° C. of 1 g/L or more, and one monomer of (iii), or a polymer consisting of structural units derived from one monomer of (i), one or two monomers of (ii) having an SP value of 11.5 $(cal/cm^3)^{1/2}$ or more, and one monomer of (iii).

More specifically, the polymer according to the first invention is preferably a polymer consisting of structural units derived from one ethylenically unsaturated monocarboxylic acid monomer and one or two monomers represented by the general formula [1], or a polymer consisting of structural units derived from one ethylenically unsaturated monocarboxylic acid monomer, one or two monomers represented by the general formula [1], and one monomer represented by the general formula [11]; more preferably a polymer consisting of structural units derived from one ethylenically unsaturated monocarboxylic acid monomer and one or two monomers represented by the general formula [2], or a polymer consisting of structural units derived from one ethylenically unsaturated monocarboxylic acid monomer, one or two monomers represented by the general formula [2], and one monomer represented by the general formula [11]; and still more preferably a polymer consisting of structural units derived from one acrylic acid or methacrylic acid and one or two monomers represented by the general formula [3], or a polymer consisting of structural units derived from one acrylic acid or methacrylic acid, one or two monomers represented by the general formula [3], and one monomer represented by the general formula [11].

Still more specifically, the polymer according to the first invention is preferably a polymer consisting of structural units derived from one acrylic acid or methacrylic acid, and one or two selected from 2-hydroxyethyl acrylate, 2-hydroxypropyl acrylate, 2-hydroxy-1-methylethyl acrylate, or 4-hydroxybutyl acrylate, or a polymer consisting of structural units derived from one acrylic acid or methacrylic acid, one or two selected from 2-hydroxyethyl acrylate, 2-hydroxypropyl acrylate, 2-hydroxy-1-methylethyl acrylate, or 4-hydroxybutyl acrylate, and one selected from the more preferred specific example group of the monomer of (iii); and more preferably a polymer consisting of structural units derived from one acrylic acid and 2-hydroxyethyl acrylate and/or 4-hydroxybutyl acrylate, or a polymer consisting of structural units derived from one acrylic acid, 2-hydroxyethyl acrylate and/or 4-hydroxybutyl acrylate, and one selected from the more preferred specific example group of the monomer of (iii).

In a case where the polymer according to the first invention is neutralized (in a case where the polymer forms a salt), it is preferable that a part or all of the carboxy group in the structural unit derived from the monomer of (i) and/or the sulfo group or the phosphate group in the structural unit derived from the monomer of (ii) is neutralized. In addition, examples of the neutralizing agent used in a case of neutralizing the polymer according to the first invention include an inorganic base such as a hydroxide, a carbonate, or a hydrogen carbonate of an alkali metal or an alkaline earth metal; and an organic base such as a polyvalent amine having an amine value of 21 or more, an ammonium salt, an aliphatic phosphine, an aromatic phosphine, a phosphonium salt, an aliphatic thiol, an aromatic thiol, a thiol derivative, or a sulfonium salt. Specific examples of the neutralizing agent include a hydroxide of an alkali metal such as sodium hydroxide, lithium hydroxide, or potassium hydroxide; a carbonate of an alkali metal such as sodium carbonate, lithium carbonate, or potassium carbonate; a hydrogen carbonate of an alkali metal such as lithium hydrogen carbonate, sodium hydrogen carbonate, or potassium hydrogen carbonate; a hydroxide of an alkaline earth metal such as magnesium hydroxide or calcium hydroxide; a carbonate of an alkaline earth metal such as magnesium carbonate or calcium carbonate; a polyvalent amine having an amine value of 21 or more such as ethylenediamine, 1,2-propanediamine, N-methyl-1,3-propanediamine, bis(2-aminoethyl)amine, tris(2-aminoethyl)amine, or polyethyleneimine; an ammonium salt such as tetrabutylammonium tetrafluoroborate or hexadecyltrimethylammonium hexafluorophosphate; an aliphatic phosphine such as trimethylphosphine; an aromatic phosphine such as triphenylphosphine; a phosphonium salt such as tetraethylphosphonium hexafluorophosphate, 1H-benzotriazol-1-yloxytris(dimethylamino)phosphonium hexafluorophosphate, or 1H-benzotriazol-1-yloxytris(dimethylamino)phosphonium hexafluorophosphate; an aliphatic thiol such as 1-butanethiol; an aromatic thiol such as phenylmethanethiol or thiophene; a thiol derivative such as 2-hydroxyethyl mercaptan; and a sulfonium salt such as 1,3-benzodithiolylium tetrafluoroborate or dimethylphenacylsulfonium tetrafluoroborate. Among these specific examples, a hydroxide of an alkali metal and a polyvalent amine having an amine value of 21 or more are preferable; sodium hydroxide, lithium hydroxide, potassium hydroxide, ethylenediamine, 1,2-propanediamine, and N-methyl-1,3-propanediamine, tris(2-aminoethyl)amine, and polyethyleneimine are more preferable; and sodium hydroxide and polyethyleneimine are particularly preferable. The neutralizing agents may be used alone or in combination of two or more thereof. It is preferable to use only one neutralizing agent alone or two neutralizing agents in combination. In particular, it is preferable that only one hydroxide of an alkali metal is used alone; or one hydroxide of an alkali metal and one polyvalent amine having an amine value of 21 or more are used in combination.

It should be noted that the "polyvalent amine having an amine value of 21 or more" refers to a polyvalent amine which has two or more basic functional groups such as an amino group and has an amine value of 21 or more, indicating an amount of the basic functional groups in a structure thereof. The amine value in the present invention (first invention and second invention) can be specifically obtained from the calculation formula shown below. It should be noted that the basic functional group in the present invention (first invention and second invention) represents a functional group showing basicity, such as an amino group, an amidino group (amidine structure), a guanidino group (guanidine structure), a pyridino group (pyridine structure), or a phosphazeno group (phosphazene structure).

Calculation formula: amine value(meq./g)=number of basic functional groups/molecular weight (provided that, in a case of a high molecular weight substance, the calculation shall be carried out with the molecular weight as the molecular weight per monomer unit and the number of basic functional groups as the number of basic functional groups per monomer unit.)

In a case where the polymer according to the first invention is neutralized, a degree of neutralization is usually 50% or more and 200% or less, preferably 60% or more and 150% or less, and more preferably 70% or more and 100% or less. It should be noted that the degree of neutralization referred to here represents a ratio of the total number of moles of the neutralizing agent to the total number of moles of the carboxy group, the sulfo group, and the phosphate group contained in the polymer according to the first invention. In a case where the binder of the first invention contains a salt of the polymer according to the first invention, the dispersibility of the conductive assistant is further improved, and the conductive assistant can be more uniformly distributed on the collector, which makes it possible to further improve the electrical characteristics of the electrode.

The polymer according to the first invention may be produced by carrying out a polymerization reaction according to a method known per se. Specifically, the polymer according to the first invention can be produced, for example, by subjecting the monomer of (i) and the monomer of (ii), and if necessary, the monomer of (iii) and/or the another monomer, according to a desired polymer, to a polymerization reaction in the presence of a polymerization initiator.

The amounts of the monomer of (i) and the monomer of (ii) used in the polymerization reaction may be appropriately set according to a content ratio (molar ratio) of the structural unit derived from the monomer of (i) to the structural unit derived from the monomer of (ii) in the polymer according to the first invention. In addition, the amount of the monomer of (iii) and/or the another monomer used in the polymerization reaction may be appropriately set according to the content in a case where the polymer according to the first invention contains a structural unit derived from the monomer of (iii) and/or the another monomer.

The polymerization reaction may be carried out according to a method known per se. Specifically, the reaction may be carried out in a suitable solvent, usually at 30° C. or higher and 200° C. or lower, preferably 60° C. or higher and 150° C. or lower, more preferably 70° C. or higher and 100° C. or lower for usually 0.1 hours or longer and 24 hours or shorter, preferably 1 hour or longer and 10 hours or shorter.

The polymerization initiator is not particularly limited as long as it is commonly used in the art, and specific examples thereof include 2,2'-azobis(isobutyronitrile), 2,2'-azobis(2,4-dimethylvaleronitrile), 2,2'-azobis(2-methylpropionate), 2,2'-azobis(2-methylbutyronitrile), 2,2'-azobis(2-methylpropionamidine) dihydrochloride, 2,2'-azobis[N-(2-carboxyethyl)-2-methylpropionamidine] tetrahydrate, 2,2'-azobis[2-(2-imidazolin-2-yl)propane], 2,2'-azobis[2-methyl-N-(2-hydroxyethyl)propionamide], ammonium persulfate (ammonium peroxodisulfate), potassium persulfate (potassium peroxodisulfate), benzoyl peroxide, and lauroyl peroxide. These polymerization initiator compounds may be used alone or in combination of two or more thereof. The amount of the polymerization initiator used is usually 0.001 mol % or more and 30 mol % or less with respect to the total mass of reactants.

The solvent is not particularly limited as long as it is commonly used in the art, and specific examples thereof include water, methanol, N-methyl-2-pyrrolidone (NMP), toluene, 1,4-dioxane, tetrahydrofuran, isopropanol, methyl ethyl ketone, and propylene glycol monomethyl ether acetate, among which water is preferable. These solvent compounds may be used alone or in combination of two or more thereof. The amount of the solvent used is 1 time (equal amount) or more and 20 times or less with respect to the total mass of reactants.

If necessary, the product obtained after the polymerization reaction may be subjected to general post-treatment operations and purification operations commonly carried out in the art. Specifically, for example, filtration, washing, extraction, concentration under reduced pressure, recrystallization, distillation, and column chromatography may be carried out.

In a case where the polymer according to the first invention is neutralized, the polymer according to the first invention obtained by the polymerization reaction may be neutralized according to a method known per se. Specifically, the polymer according to the first invention may be neutralized, for example, by adding the neutralizing agent in an amount such that the polymer according to the first invention has a desired degree of neutralization. Examples of the solvent used for neutralization include the same solvents as those used in the polymerization reaction.

Specifically, the polymer or salt thereof according to the first invention is produced as follows.

That is, the monomer of (i) and the monomer of (ii) in a molar ratio of 5:95 to 95:5, and if necessary, the monomer of (iii) and/or the another monomer used in an amount of 0.01 mol % or more and 5 mol % or less with respect to the content of the structural units derived from the monomer of (i) and the monomer of (ii) are dissolved or dispersed in a solvent such as water in an amount equal to or more and 20 times or less the total mass of reactants, in the presence of a polymerization initiator such as 2,2'-azobis(isobutyronitrile) of 0.001 mol % or more and 30 mol % or less with respect to the total mass of the reactants. Then, a polymerization reaction is carried out at 30° C. or higher and 200° C. or lower for 0.1 hours or longer and 24 hours or shorter to produce the polymer according to the first invention. In addition, if necessary, the neutralizing agent may be added in an amount such that the obtained polymer according to the first invention has a desired degree of neutralization to obtain a salt of the polymer according to the first invention.

Binder Solution

The binder of the first invention may be contained in a slurry composition of the first invention or an electrode of the first invention which will be described later, in a form dissolved in a solvent. In the first invention, a solution in which the binder is dissolved in a solvent is referred to as a "binder solution", and in particular, a solution in which the binder of the first invention is dissolved in a solvent is referred to as a "binder solution according to the first invention".

The solvent in the binder solution according to the first invention is not particularly limited as long as it is commonly used in the art, and specific examples thereof include water, N-methyl-2-pyrrolidone (NMP), dimethylformamide, dimethylacetamide, methylformamide, dimethyl sulfoxide, acetonitrile, tetrahydrofuran, γ-butyrolactone, toluene, methyl ethyl ketone, ethyl acetate, and dioxane, among which water is preferable. These solvent compounds may be used alone or in combination of two or more thereof. It is preferable to use only one solvent compound alone. It should be noted that, in a case where the solvent is water, the binder solution may be referred to as "the binder aqueous solution according to the first invention".

The content (mass of solid content) of the binder of the first invention in the binder solution according to the first invention may be appropriately set according to a desired concentration of the binder solution according to the first invention, and is usually 1% by mass or more and 70% by mass or less, preferably 5% by mass or more and 50% by mass or less.

The binder solution according to the first invention may contain various additives commonly used in the art, in addition to the binder of the first invention and a solvent. Examples of various additives include a dispersant, a thickener, a metal binder (for example, aminotriazole), a reducing agent (for example, ascorbic acid), a preservative (for example, cetylpyridinium chloride), a rust inhibitor, a fungicide, an antibacterial agent, a deodorant, a leveling agent, a defoamer, a blister inhibitor, an anti-yellowing agent, an antistatic agent, a charge regulator, an electrolyte decomposition inhibitor, an antioxidant, an anti-aging agent, a light stabilizer, an ultraviolet absorber, a thixotropic agent, a freeze stabilizer, a pH adjuster, a lubricant, a rheology control agent, and a film forming aid. These additives may be used alone or in combination of two or more thereof, depending on the purpose. The content of various additives in the binder solution according to the first invention is usually 10% by mass or less, preferably 5% by mass or less, and more preferably 1% by mass or less with respect to the content of the binder of the first invention.

Slurry Composition of First Invention

The slurry composition of the first invention is a composition for preparing an electrode for an electricity storage device, which contains the binder of the first invention. More specifically, the slurry composition of the first invention is a composition containing an active material and a solvent, and if necessary, a conductive assistant, in addition to the binder of the first invention (or the binder solution according to the first invention). The slurry composition of the first invention may be used for preparing a positive electrode or a negative electrode, and is preferably used for preparing a negative electrode.

The content of the binder of the first invention in the slurry composition of the first invention is usually 0.1% by mass or more and 30% by mass or less, preferably 0.5% by mass or more and 20% by mass or less, and more preferably 1% by mass or more and 10% by mass or less with respect to the total mass of the slurry composition of the first invention containing no solvent.

The active material in the slurry composition of the first invention is not particularly limited as long as it is commonly used in the art, and specific examples thereof include carbon, silicon, germanium, tin, lead, zinc, aluminum, indium, antimony, bismuth, sodium, magnesium, titanium, and compounds containing these as elements (such as oxides), among which carbon, silicon, or a compound containing silicon as an element is preferable. These active materials may be used alone or in combination of two or more thereof.

Examples of the carbon include a graphite-based carbon material (graphite) such as natural graphite, artificial graphite, or expanded graphite, carbon black, activated carbon, carbon fiber, coke, soft carbon, and hard carbon. Among these specific examples, graphite such as natural graphite, artificial graphite, or expanded graphite is preferable. Examples of the natural graphite include flake graphite and vein graphite. Examples of the artificial graphite include vein graphite, vapor-grown graphite, flake graphite, and fibrous graphite.

Examples of the silicon or compound containing silicon as an element include silicon as well as a silicon oxide such as SiO or $SiO_2$, and silicon bonded to a metal, SiM (M represents a metal such as magnesium, iron, calcium, cobalt, nickel, boron, copper, manganese, silver, vanadium, cerium, or zinc), among which the silicon or the silicon oxide is preferable, and the silicon is more preferable. In addition, the surface of silicon may be partially or completely coated with carbon, and examples of the surface-coated silicon include carbon-coated silicon, a silicon oxide, and silicon bonded to a metal, among which the carbon-coated silicon or the silicon oxide is preferable and the carbon-coated silicon oxide is more preferable.

The active material in the slurry composition of the first invention preferably contains one or more carbons and/or one or more silicons or compounds containing silicon as an element, and more preferably contains one or more carbons and one or more silicons or compounds containing silicon as an element. More specific examples of the active material include an active material containing a mixture of at least one selected from natural graphite, artificial graphite, or expanded graphite and at least one selected from silicon, a silicon oxide, carbon-coated silicon, or a carbon-coated silicon oxide, among which an active material containing natural graphite and a carbon-coated silicon oxide is preferable.

The average particle diameter of the active material in the slurry composition of the first invention varies depending on the type of active material used, and is usually 0.001 µm or more and 100 µm or less, preferably 0.01 µm or more and 50 µm or less, and more preferably 0.1 µm or more and 30 µm or less.

The content of the active material in the slurry composition of the first invention is usually 30% by mass or more and 99.9% by mass or less, preferably 40% by mass or more and 99% by mass or less, and preferably 50% by mass or more and 98% by mass or less with respect to the total mass of the slurry composition of the first invention containing no solvent.

The conductive assistant in the slurry composition of the first invention is not particularly limited as long as it is commonly used in the art, and specific examples thereof include carbon blacks such as acetylene black, Ketjen black, furnace black, and thermal black; and nanocarbons such as carbon nanotubes and carbon nanohoms, among which the acetylene black and the Ketjen black are preferable and the acetylene black is more preferable. These conductive assistants may be used alone or in combination of two or more thereof.

The average particle diameter of the conductive assistant in the slurry composition of the first invention varies depending on the type of the conductive assistant used, and is usually 0.001 µm or more and 50 µm or less, preferably 0.01 µm or more and 10 µm or less, and more preferably 0.02 µm or more and 1 µm or less.

The content of the conductive assistant in the slurry composition of the first invention is usually 0.1% by mass or more and 40% by mass or less, preferably 0.5% by mass or more and 30% by mass or less, and preferably 1% by mass or more and 20% by mass or less with respect to the total mass of the slurry composition of the first invention containing no solvent.

The solvent in the slurry composition of the first invention is not particularly limited as long as it is commonly used in the art, and specific examples thereof include water, N-methyl-2-pyrrolidone (NMP), dimethylformamide, dimethylacetamide, methylformamide, dimethyl sulfoxide, acetonitrile, tetrahydrofuran, γ-butyrolactone, toluene, methyl ethyl ketone, ethyl acetate, and dioxane, among which water is preferable. These solvent compounds may be used alone or in combination of two or more thereof. It is preferable to use only one solvent compound alone. In addition, in a case where the binder of the first invention is contained in the slurry composition of the first invention in the form of a binder solution, the solvent in the slurry composition of the first invention is preferably the same as the solvent in the binder solution according to the first invention.

The slurry composition of the first invention may contain a supporting salt, an additive, and the like commonly used in the art, in addition to the binder of the first invention, an active material, a conductive assistant, and a solvent.

Examples of the supporting salt include $Li(C_2F_5SO_2)_2N$ (LiBETI), $LiPF_6$, $LiBF_4$, $LiClO_4$, $LiAsF_6$, and $LiCF_3SO_3$. Examples of the additive include a dispersant, a thickener, a metal binder, a reducing agent, a preservative, a rust inhibitor, a fungicide, an antibacterial agent, a deodorant, a leveling agent, a defoamer, a blister inhibitor, an anti-yellowing agent, an antistatic agent, a charge regulator, an electrolyte decomposition inhibitor, an antioxidant, an anti-aging agent, a light stabilizer, an ultraviolet absorber, a thixotropic agent, a freeze stabilizer, a pH adjuster, a lubricant, a rheology control agent, and a film forming aid. These additives may be used alone or in combination of two or more thereof, depending on the purpose. The contents of the supporting salt and the additive may be appropriately set according to the amounts commonly used in the art.

The slurry composition of the first invention may be prepared according to a method known per se. Specifically, the slurry composition of the first invention can be prepared, for example, by appropriately mixing the binder of the first invention, an active material, and if necessary, a conductive assistant, a supporting salt and/or an additive in a solvent so as to have the above-mentioned contents, according to a desired slurry composition.

Electrode of First Invention

The electrode of the first invention is an electrode for an electricity storage device consisting of the slurry composition of the first invention. More specifically, the electrode of the first invention is an electrode having an electrode mixture layer derived from the slurry composition of the first invention, which contains the binder of the first invention (or the binder solution according to the first invention), an active material, a solvent, and if necessary, a conductive assistant, a supporting salt and/or an additive, and a collector. The electrode of the first invention can be used as both a negative electrode and a positive electrode, and is preferably used as a positive electrode.

The collector in the electrode of the first invention is not particularly limited as long as it is commonly used in the art, and specific examples thereof include a collector made of a conductive material such as platinum, copper, stainless steel (SUS), Hastelloy, aluminum, iron, chromium, nickel, titanium, Inconel, molybdenum, graphite, or carbon, and having a shape such as a plate, a foil (sheet or paper), a mesh, an expanded grid (expanded metal), or a punched metal. The mesh opening, wire diameter, number of meshes, and the like of the collector are not particularly limited, and conventionally known ones can be used. The thickness of the collector is usually 1 µm or more and 300 µm or less, and preferably 5 µm or more and 30 µm or less. The size of the collector is determined according to the intended use of the battery. In a case where a large electrode used for a large battery is to be prepared, a collector having a large area is used, and in a case where a small electrode is to be prepared, a collector having a small area is used.

The electrode of the first invention may be produced according to a method known per se. Specifically, the electrode of the first invention can be prepared, for example, by coating or crimping the slurry composition of the first invention on a collector and drying the slurry composition to form an electrode mixture layer on the collector. The thickness of the electrode mixture layer is usually 1 µm or more and 1000 µm or less, preferably 1 µm or more and 500 µm or less, and more preferably 1 µm or more and 300 µm or less.

In the production of the electrode of the first invention, the amount of the slurry composition of the first invention used may be appropriately set such that the thickness of the electrode mixture layer falls within the above-mentioned range after drying.

In the production of the electrode of the first invention, the slurry composition of the first invention may be coated or crimped on the collector according to a method known per se. As a specific coating/crimping method, for example, a self-propelled coater, an ink jet method, a doctor blade method, a spray method, a die coating method, or a combination thereof can be used. Among these specific examples, the doctor blade method, the ink jet method, and the die coating method capable of forming a thin layer are preferable, and the doctor blade method and the die coating method are more preferable.

In the production of the electrode of the first invention, the slurry composition of the first invention may be dried according to a method known per se, and is usually dried by a heat treatment. The drying conditions during heating (necessity of vacuum, drying time, and drying temperature) may be appropriately set according to the coating amount of the slurry composition of the first invention and the volatilization rate of the solvent in the slurry composition of the first invention. As a specific drying method, the slurry composition may be dried, for example, in air or vacuum, usually at 50° C. or higher and 400° C. or lower, preferably 70° C. or higher and 200° C. or lower, usually for 1 hour or longer and 20 hours or shorter, preferably 3 hours or longer and 15 hours or shorter. In addition, the heat treatment may be carried out twice or more by changing the drying conditions.

In the production of the electrode of the first invention, if necessary, a press treatment may be carried out before and after the drying. The press treatment may be carried out according to a method known per se, and specific press treatment methods include, for example, a calender roll method and a flat plate press, among which the calender roll method is preferable.

Electricity Storage Device of First Invention

The electricity storage device of the first invention refers to a device, an element, or the like having the electrode of the first invention and capable of chemically, physically, or physicochemically storing electricity. Specific examples thereof include devices that can be charged and discharged, such as secondary batteries (storage batteries), for example, a secondary battery with multivalent ions such as magnesium ions, a lithium ion secondary battery, a sodium ion secondary battery, a potassium ion secondary battery, a nickel hydrogen storage battery, a nickel cadmium storage battery, and a lead storage battery; and electric double layer capacitors (electric double layer condensers), for example, a lithium ion capacitor. Among these specific examples, an electricity storage device using lithium ions such as a lithium ion capacitor or a lithium ion secondary battery is preferable, and the lithium ion secondary battery is more preferable.

The configuration of the electricity storage device of the first invention may be the same as that of a general electricity storage device commonly used in the art. Specifically, for example, the electricity storage device is configured such that a positive electrode and a negative electrode are placed facing each other through a separator, and if necessary, impregnated with an electrolytic solution. The electricity storage device of the first invention may be any electricity storage device provided with the electrode of the first invention as the positive electrode and/or the negative electrode. As a member constituting the electricity storage device of the first invention other than the electrode of the first invention, a member commonly used in the art can be appropriately adopted.

The separator in the electricity storage device of the first invention may be a separator that electrically insulates a positive electrode and a negative electrode while allowing ions to pass therethrough, and examples thereof include a glass fiber and a microporous polymer such as porous polyolefin. Specific examples of the porous polyolefin include porous polyethylene, porous polypropylene, and a product in which porous polyethylene and porous polypropylene are superposed to form a multi-layer.

The electrolytic solution in the electricity storage device of the first invention is preferably a non-aqueous electrolytic solution containing an electrolyte, an organic solvent, and an additive. The electrolyte varies depending on a desired electricity storage device. For example, in a case where the desired electricity storage device is a lithium ion secondary battery, examples of the electrolyte include lithium salts such as $LiBF_4$, $LiPF_6$, $LiAsF_6$, $LiSbF_6$, $LiAlCl_4$, $LiCl$, $LiBr$, $LiClO_4$, $LiBrO_4$, $LiIO_4$, $LiCH_3SO_3$, and $LiCF_3SO_3$, among which $LiPF_6$ is preferable. These lithium salts may be used alone or in combination of two or more thereof. The content of the electrolyte in the non-aqueous electrolytic solution is usually 0.05 mol/L or more and 15 mol/L or less and preferably 0.1 mol/L or more and 5 mol/L or less.

Specific examples of the organic solvent in the non-aqueous electrolytic solution include ethylene carbonate, dimethyl carbonate, propylene carbonate, diethyl carbonate, ethyl methyl carbonate, γ-butyrolactone (lactones), and sulfolane, among which ethylene carbonate, ethyl methyl carbonate, diethyl carbonate, and dimethyl carbonate are preferable. These organic solvents may be used alone or in combination of two or more thereof.

Specific examples of the additive in the non-aqueous electrolytic solution include vinylene carbonate, fluorovinylene carbonate, methylvinylene carbonate, fluoromethylvinylene carbonate, ethylvinylene carbonate, propylvinylene carbonate, butylvinylene carbonate, dipropylvinylene carbonate, 4,5-dimethylvinylene carbonate, 4,5-diethylvinylene carbonate, vinylethylene carbonate, divinylethylene carbonate, phenylethylene carbonate, diallyl carbonate, fluoroethylene carbonate, catechol carbonate, 1,3-propane sultone, and butane sultone, among which vinylene carbonate and fluoroethylene carbonate are preferable. These additives may be used alone or in combination of two or more thereof. The content of the additive in the non-aqueous electrolytic solution is usually 0.05% by mass or more and 15% by mass or less and preferably 0.1% by mass or more and 5% by mass or less.

The non-aqueous electrolytic solution in the electricity storage device of the first invention may contain additives such as a film forming agent, an overcharge inhibitor, an oxygen scavenger, a dehydrating agent, and a flame retardant, and a coordinating additive such as crown ether, which are commonly used in the art, in addition to an electrolyte and an organic solvent.

The shape of the electricity storage device of the first invention is not particularly limited. A shape commonly used in the art, such as a wound type or a laminated type as an internal shape, and a coin type, a laminated type (pouch type), a square type, or a cylindrical type as an external shape, can be appropriately adopted.

Binder of Second Invention

The binder according to the second invention contains a salt of a polymer which contains structural units derived from (i) an ethylenically unsaturated carboxylic acid monomer and (ii) an ethylenically unsaturated monomer having at least one group selected from a hydroxy group, a dialkylamino group, an acetyl group, a sulfo group, a phosphate group, or a cyano group and is neutralized with a monoamine, a polyvalent amine having an amine value of less than 21, and/or an onium hydroxide (hereinafter, sometimes referred to simply as the polymer according to the second invention).

Specific examples of each of the monomer of (i) and the monomer of (ii) in the polymer according to the second invention include the same specific examples of each of the monomer of (i) and the monomer of (ii) in the polymer according to the first invention, and preferred specific examples thereof are also the same. In addition, the content ratio (molar ratio) of the structural unit derived from the monomer of (i) to the structural unit derived from the monomer of (ii) in the polymer according to the second invention is the same as the content ratio in the polymer according to the first invention.

The polymer according to the second invention may further contain a structural unit derived from (iii) a monomer having two or more polymerizable unsaturated groups, in addition to the monomer of (i) and the monomer of (ii). Specific examples of the monomer of (iii) in the polymer according to the second invention include the same specific examples of the monomer of (iii) in the polymer according to the first invention, and preferred specific examples thereof are also the same. In addition, in a case where the polymer according to the second invention contains a structural unit derived from the monomer of (iii), the content thereof is the same as the content of the monomer of (iii) in a case where the polymer according to the first invention contains a structural unit derived from the monomer of (iii).

The polymer according to the second invention may appropriately contain a structural unit derived from a monomer commonly used in the art, in addition to the monomer of (i), the monomer of (ii), and the monomer of (iii). The monomer is the same as the another monomer in the polymer according to the first invention, and the content thereof is also the same as the content of the another monomer in a case where the polymer according to the first invention contains a structural unit derived from the another monomer.

In addition, the polymer according to the second invention may contain two or more structural units derived from the monomer of (i), the monomer of (ii), and the monomer of (iii), respectively.

Specific examples of the polymer according to the second invention include the same specific examples of the polymer according to the first invention, and preferred specific examples thereof are also the same.

The polymer according to the second invention is a salt of a polymer neutralized with a monoamine, a polyvalent amine having an amine value of less than 21, and/or an onium hydroxide (hereinafter, sometimes referred to simply as a neutralizing agent according to the second invention). The polymer according to the second invention is preferably a polymer in which a part or all of carboxy groups in the structural unit derived from the monomer of (i) and/or sulfo groups or phosphate groups in the structural unit derived from the monomer of (ii) are neutralized by the neutralizing agent according to the second invention.

The monoamine in the neutralizing agent according to the second invention is a monovalent amine having only one basic functional group. Specific examples of the monoamine include a monoamine having one amino group or a derivative thereof, such as tert-butylamine, amylamine (pentylamine), octylamine, diisopropylethylamine, dibutylamine, triethylamine, benzylamine, aniline, monoethanolamine, N,N-diethylethanolamine, bis(2-cyanoethyl)amine, tris(2-cyanoethyl)amine, 3-aminopropionitrile, 3-methoxypropylamine, 3-aminotriazole, or 3-aminopropyltrimethoxysilane; a monoamine having one amidino group (amidine structure) or a derivative thereof, such as diazabicyclononene; a monoamine having one guanidino group (guanidine structure) or a derivative thereof, such as tetramethylguanidine or diazabicycloundecene; a monoamine having one pyridino group (pyridine structure) or a derivative thereof, such as pyridine; and a monoamine having one phosphazeno group (phosphazene structure) or a derivative thereof, such as hexafluorocyclotriphosphazene or hexachlorocyclotriphosphazene. Among these specific examples, monoethanolamine, N,N-diethylethanolamine, 3-methoxypropylamine, and 3-aminotriazole are preferable, and 3-methoxypropylamine and 3-aminotriazole are particularly preferable.

The polyvalent amine having an amine value of less than 21 in the neutralizing agent according to the second invention refers to a polyvalent amine which has two or more basic functional groups and has an amine value of less than 21, indicating an amount of the basic functional groups in a structure thereof. A polyvalent amine having a low molecular weight is preferable among the polyvalent amines. Specifically, the polyvalent amine having a molecular weight of 600 or less is preferable. Specific examples thereof include 3,5-diaminotriazole, 4-dimethylaminopyridine, poly(propylene glycol) bis(2-aminopropyl ether) (JEFFAMINE (registered trademark) D-400), and O,O'-bis(2-aminopropyl) polypropylene glyco-block-polyethylene glycol-block-polypropylene glycol (JEFFAMINE (registered trademark) ED-600). Among these specific examples, 3,5-diaminotriazole, poly(propylene glycol) bis(2-aminopropyl ether), and O,O'-bis(2-aminopropyl)polypropylene glyco-block-polyethylene glycol-block-polypropylene glycol are preferable, and 3,5-diaminotriazole and O,O'-bis(2-aminopropyl)polypropylene glyco-block-polyethylene glycol-block-polypropylene glycol are particularly preferable.

Examples of the onium hydroxide in the neutralizing agent according to the second invention include ammonium hydroxide, phosphonium hydroxide, and sulfonium hydroxide, which may have a substituent. Specific examples thereof include an ammonium hydroxide such as benzyltrimethylammonium hydroxide or tetrabutylammonium hydroxide; a phosphonium hydroxide such as tetrabutylphosphonium hydroxide; and a sulfonium hydroxide such as trimethylsulfonium hydroxide. Among these specific examples, ammonium hydroxide is preferable, and benzyltrimethylammonium hydroxide or tetrabutylammonium hydroxide is particularly preferable.

Among the specific examples of the neutralizing agent according to the second invention, 3-methoxypropylamine, 3-aminotriazole, 3,5-diaminotriazole, poly(propylene glycol) bis(2-aminopropyl ether) (JEFFAMINE (registered trademark) D-400), O,O'-bis(2-aminopropyl)polypropylene glyco-block-polyethylene glycol-block-polypropylene glycol (JEFFAMINE (registered trademark) ED-600), or tetrabutylammonium hydroxide is preferable; 3-methoxypropylamine, 3-aminotriazole, 3,5-diaminotriazole, poly(propylene glycol) bis(2-aminopropyl ether) (JEFFAMINE (registered trademark) D-400), or O,O'-bis(2-aminopropyl) polypropylene glyco-block-polyethylene glycol-block-polypropylene glycol (JEFFAMINE (registered trademark) ED-600) is more preferable; and 3,5-diaminotriazole or O,O'-bis(2-aminopropyl)polypropylene glyco-block-polyethylene glycol-block-polypropylene glycol (JEFFAMINE (registered trademark) ED-600) is particularly preferable. The neutralizing agent according to the second invention may be used alone or in combination of two or more thereof. It is preferable to use only one neutralizing agent alone.

In addition, a conventionally known neutralizing agent may be used in combination, in addition to the neutralizing agent according to the second invention. Examples of the neutralizing agent used in combination include inorganic bases such as hydroxides, carbonates, and hydrogen carbonates of alkali metals or alkaline earth metals. Specific examples thereof include a hydroxide of an alkali metal such as sodium hydroxide, lithium hydroxide, or potassium hydroxide; a carbonate of an alkali metal such as sodium carbonate, lithium carbonate, or potassium carbonate; a hydrogen carbonate of an alkali metal such as lithium hydrogen carbonate, sodium hydrogen carbonate, or potassium hydrogen carbonate; a hydroxide of an alkaline earth metal such as magnesium hydroxide or calcium hydroxide; and a carbonate of an alkaline earth metal such as magnesium carbonate or calcium carbonate. Among these specific examples, a hydroxide of an alkali metal is preferable, and sodium hydroxide is particularly preferable. With regard to the neutralizing agent to be used in combination, only one type thereof may be used in combination with the neutralizing agent according to the second invention, or two or more types thereof may be used in combination with the neutralizing agent according to the second invention. It is preferable to use only one type thereof in combination with the neutralizing agent according to the second invention. In particular, it is preferable to use only one hydroxide of an alkali metal in combination with the neutralizing agent according to the second invention.

The degree of neutralization of the polymer according to the second invention is usually 50% or more and 300% or less, preferably 60% or more and 200% or less, and more preferably 70% or more and 150% or less. It should be noted that the degree of neutralization referred to here represents a ratio of the total number of moles of the neutralizing agent according to the second invention to the total number of moles of the carboxy group, the sulfo group, and the phosphate group contained in the polymer according to the second invention. Incorporation of the polymer according to the second invention in the binder of the second invention leads to improved flexibility of an electrode to be produced, which makes it possible to produce an electrode having excellent winding properties.

The polymer according to the second invention may be produced by carrying out a polymerization reaction and neutralization according to a method known per se. Specifically, for example, the polymer according to the second invention may be produced in such a manner that the same polymerization reaction as that of the polymer according to the first invention is carried out, and the polymer obtained by the polymerization reaction is neutralized by adding an amount of the neutralizing agent according to the second invention to obtain a desired degree of neutralization. Examples of the solvent used for neutralization include the same solvents as those used in the polymerization reaction of the polymer according to the first invention.

Binder Solution

The binder of the second invention may be contained in a slurry composition of the second invention or an electrode of the second invention which will be described later, in a form dissolved in a solvent. In the second invention, a solution in which the binder is dissolved in a solvent is referred to as a "binder solution", and in particular, a solution in which the binder of the second invention is dissolved in a solvent is referred to as a "binder solution according to the second invention".

Examples of the solvent in the binder solution according to the second invention include the same solvents as those in the binder solution according to the second invention, and preferred examples thereof are also the same. It should be noted that, in a case where the solvent is water, the binder solution may be referred to as "the binder aqueous solution according to the second invention".

The content (mass of solid content) of the binder of the second invention in the binder solution according to the second invention may be appropriately set according to a desired concentration of the binder solution according to the second invention, and is usually 1% by mass or more and 70% by mass or less, preferably 5% by mass or more and 50% by mass or less.

The binder solution according to the second invention may contain various additives commonly used in the art, in addition to the binder of the second invention and a solvent. Examples of the additive include the same various additives in the binder solution according to the first invention, and the content thereof is also the same as the content of the additive in a case where the binder solution according to the first invention contains various additives.

Slurry Composition of Second Invention

The slurry composition of the second invention is a composition for preparing an electrode for an electricity storage device, which contains the binder of the second invention. More specifically, the slurry composition of the second invention is a composition containing an active material and a solvent, and if necessary, a conductive assistant, in addition to the binder of the second invention (or the binder solution according to the second invention). The slurry composition of the second invention may be used for preparing a positive electrode or a negative electrode, and is preferably used for preparing a negative electrode.

The content of the binder of the second invention in the slurry composition of the second invention is usually 0.1% by mass or more and 30% by mass or less, preferably 0.5% by mass or more and 20% by mass or less, and more preferably 1% by mass or more and 10% by mass or less with respect to the total mass of the slurry composition of the second invention containing no solvent.

Examples of the active material, conductive assistant, and solvent in the slurry composition of the second invention include the same active material, conductive assistant, and solvent in the slurry composition of the first invention, and preferred examples thereof are also the same. In addition, the content of the active material, the conductive assistant, and the solvent in the slurry composition of the second invention is the same as the content of the active material, the conductive assistant, and the solvent in the slurry composition of the first invention.

The slurry composition of the second invention may contain a supporting salt, an additive, and the like commonly used in the art, in addition to the binder of the second invention, an active material, a conductive assistant, and a solvent. Examples of the supporting salt and additive include the same supporting salt and additive in the slurry composition of the first invention, and the content thereof may be appropriately set according to the amount commonly used in the art.

The slurry composition of the second invention may be prepared according to a method known per se. Specifically, the slurry composition of the second invention can be prepared, for example, by appropriately mixing the binder of the second invention, an active material, and if necessary, a conductive assistant, a supporting salt and/or an additive in a solvent so as to have the above-mentioned contents, according to a desired slurry composition.

Electrode of Second Invention

The electrode of the second invention is an electrode for an electricity storage device consisting of the slurry composition of the second invention. More specifically, the electrode of the second invention is an electrode having an electrode mixture layer derived from the slurry composition of the second invention, which contains the binder of the second invention (or the binder solution according to the second invention), an active material, a solvent, and if necessary, a conductive assistant, a supporting salt and/or an additive, and a collector. The electrode of the second invention can be used as both a negative electrode and a positive electrode, and is preferably used as a positive electrode.

Examples of the collector in the electrode of the second invention include the same collector as in the electrode of the first invention, and preferred examples thereof are also the same.

The electrode of the second invention may be produced by the same production method as the electrode of the first invention.

In the production of the electrode of the second invention, the amount of the slurry composition of the second invention used may be appropriately set such that the thickness of the electrode mixture layer becomes a desired thickness after drying.

In the production of the electrode of the second invention, the coating or crimping of the slurry composition of the second invention on the collector may be carried out in the same manner as in the coating or crimping of the slurry composition of the first invention on the collector.

In the production of the electrode of the second invention, the drying of the slurry composition of the second invention may be carried out in the same manner as in the drying of the slurry composition of the first invention.

In the production of the electrode of the second invention, if necessary, a press treatment may be carried out before and after the drying. The press treatment may be carried out in the same manner as in the press treatment in the production of the electrode of the first invention.

Electricity Storage Device of Second Invention

The electricity storage device of the second invention refers to a device, an element, or the like having the electrode of the second invention and capable of chemically, physically, or physicochemically storing electricity. Specifically, for example, the electricity storage device of the second invention may be the same as the electricity storage device of the first invention, and the preferred one thereof is also the same.

The configuration of the electricity storage device of the second invention may be the same as that of the electricity storage device of the first invention. In addition, examples of the members constituting the electricity storage device of the second invention other than the electrode of the second invention include the same members as those constituting the electricity storage device of the first invention other than the electrode of the first invention, and preferred examples thereof are also the same.

The shape of the electricity storage device of the second invention is not particularly limited. A shape commonly used in the art, such as a wound type or a laminated type as an internal shape, and a coin type, a laminated type (pouch type), a square type, or a cylindrical type as an external shape, can be appropriately adopted.

Hereinafter, the present invention (first invention and second invention) will be described in more detail with reference to Examples and Comparative Examples, but the present invention is not limited to these examples.

EXAMPLES

Example 1

To a 1000 mL separable flask equipped with a stirrer, a cooling pipe, a thermometer, and a nitrogen introduction pipe were added 435 parts by mass of ion exchange water, 22 parts by mass (0.31 mol) of acrylic acid (manufactured by Toagosei Co., Ltd.), 22 parts by mass (0.19 mol) of 2-hydroxyethyl acrylate (manufactured by Osaka Organic Chemical Industry Ltd.), and 0.21 parts by mass (0.0014 mol) of N,N-methylenebisacrylamide (manufactured by FUJIFILM Wako Pure Chemical Corporation), followed by heating under a nitrogen stream until the internal temperature reached 77° C. Next, 0.34 parts by mass of 2,2'-azobis[N-(2-carboxyethyl)-2-methylpropionamidine] tetrahydrate (trade name: VA-057, manufactured by FUJIFILM Wako Pure Chemical Corporation) were added thereto, and the obtained solution was reacted at 77° C. for 4 hours. After the reaction was complete, the reaction solution was cooled to room temperature, and 20 parts by mass of 48% sodium hydroxide aqueous solution (manufactured by Toagosei Co., Ltd.) were added to obtain a binder aqueous solution 1 (solid content: 10%).

Example 2

A binder aqueous solution 2 (solid content: 10%) was obtained in the same manner as in Example 1, except that ion exchange water was used in an amount of 461 parts by mass instead of 435 parts by mass, acrylic acid was used in an amount of 5.0 parts by mass (0.069 mol) instead of 22 parts by mass, 2-hydroxyethyl acrylate was used in an amount of 45 parts by mass (0.39 mol) instead of 22 parts by mass, N,N-methylenebisacrylamide was used in an amount of 0.20 parts by mass (0.0013 mol) instead of 0.21 parts by mass, 2,2'-azobis[N-(2-carboxyethyl)-2-methylpropionamidine] tetrahydrate was used in an amount of 0.31 parts by mass instead of 0.34 parts by mass, and 48% sodium hydroxide aqueous solution was used in an amount of 4.6 parts by mass instead of 20 parts by mass.

Example 3

A binder aqueous solution 3 (solid content: 10%) was obtained in the same manner as in Example 1, except that ion exchange water was used in an amount of 521 parts by mass instead of 435 parts by mass, acrylic acid was used in an amount of 11 parts by mass (0.15 mol) instead of 22 parts by mass, 2-hydroxyethyl acrylate was used in an amount of 44 parts by mass (0.38 mol) instead of 22 parts by mass, N,N-methylenebisacrylamide was used in an amount of 0.27 parts by mass (0.0018 mol) instead of 0.21 parts by mass, 2,2'-azobis[N-(2-carboxyethyl)-2-methylpropionamidine] tetrahydrate was used in an amount of 0.42 parts by mass instead of 0.34 parts by mass, and 48% sodium hydroxide aqueous solution was used in an amount of 4.9 parts by mass instead of 20 parts by mass.

Example 4

To a 1000 mL separable flask equipped with a stirrer, a cooling pipe, a thermometer, and a nitrogen introduction pipe were added 460 parts by mass of ion exchange water, 36 parts by mass (0.50 mol) of acrylic acid, 9 parts by mass (0.11 mol) of 4-hydroxybutyl acrylate (manufactured by Osaka Organic Chemical Industry Ltd.), and 0.20 parts by mass (0.00078 mol) of pentaerythritol triallyl ether (manufactured by FUJIFILM Wako Pure Chemical Corporation), followed by heating under a nitrogen stream until the internal temperature reached 77° C. Next, 0.084 parts by mass of 2,2'-azobis[N-(2-carboxyethyl)-2-methylpropionamidine] tetrahydrate were added thereto, and the obtained solution was reacted at 77° C. for 4 hours. After the reaction was complete, the reaction solution was cooled to room temperature, and 32 parts by mass of 50% sodium hydroxide aqueous solution (manufactured by Toagosei Co., Ltd.) were added to obtain a binder aqueous solution 4 (solid content: 10%).

Example 5

A binder aqueous solution 5 (solid content: 10%) was obtained in the same manner as in Example 1, except that ion exchange water was used in an amount of 400 parts by mass instead of 435 parts by mass, acrylic acid was used in an amount of 5.0 parts by mass (0.069 mol) instead of 22 parts by mass, 2-hydroxyethyl acrylate was used in an amount of 45 parts by mass (0.39 mol) instead of 22 parts by mass, 2,2'-azobis[N-(2-carboxyethyl)-2-methylpropionamidine] tetrahydrate was used in an amount of 0.38 parts by mass instead of 0.34 parts by mass, and 48% sodium hydroxide aqueous solution was used in an amount of 4.6 parts by mass instead of 20 parts by mass, and N,N-methylenebisacrylamide was not used.

Example 6

To a 1000 mL separable flask equipped with a stirrer, a cooling pipe, a thermometer, and a nitrogen introduction pipe were added 720 parts by mass of ion exchange water, 9.0 parts by mass (0.12 mol) of acrylic acid, and 81 parts by mass (0.70 mol) of 2-hydroxyethyl acrylate, followed by heating under a nitrogen stream until the internal temperature reached 77° C. Next, 0.69 parts by mass of 2,2'-azobis[N-(2-carboxyethyl)-2-methylpropionamidine]tetrahydrate were added thereto, and the obtained solution was reacted at 77° C. for 4 hours. After the reaction was complete, the reaction solution was cooled to room temperature, and 7.3 parts by mass of 48% sodium hydroxide aqueous solution and 0.43 parts by mass of polyethyleneimine aqueous solution (molecular weight: about 10,000, manufactured by FUJIFILM Wako Pure Chemical Corporation) were added to obtain a binder aqueous solution 6 (solid content: 11%).

Example 7

To a 1000 mL separable flask equipped with a stirrer, a cooling pipe, a thermometer, and a nitrogen introduction pipe were added 350 parts by mass of ion exchange water, 5.0 parts by mass (0.069 mol) of acrylic acid, 40 parts by mass (0.34 mol) of 2-hydroxyethyl acrylate, and 5.0 parts by mass (0.035 mol) of 4-hydroxybutyl acrylate, followed by heating under a nitrogen stream until the internal temperature reached 77° C. Next, 0.38 parts by mass of 2,2'-azobis[N-(2-carboxyethyl)-2-methylpropionamidine] tetrahydrate were added thereto, and the obtained solution was reacted at 77° C. for 4 hours. After the reaction was complete, the reaction solution was cooled to room temperature, and 4.5 parts by mass of 48% sodium hydroxide aqueous solution were added to obtain a binder aqueous solution 7 (solid content: 110%).

Example 8

To a 1000 mL separable flask equipped with a stirrer, a cooling pipe, a thermometer, and a nitrogen introduction pipe were added 320 parts by mass of ion exchange water, 4.0 parts by mass (0.056 mol) of acrylic acid, 32 parts by mass (0.28 mol) of 2-hydroxyethyl acrylate, and 4.0 parts by mass (0.028 mol) of 4-hydroxybutyl acrylate, followed by heating under a nitrogen stream until the internal temperature reached 77° C. Next, 0.31 parts by mass of 2,2'-azobis[N-(2-carboxyethyl)-2-methylpropionamidine] tetrahydrate were added thereto, and the obtained solution was reacted at 77° C. for 4 hours. After the reaction was complete, the reaction solution was cooled to room temperature, and 4.5 parts by mass of 48% sodium hydroxide aqueous solution and 0.19 parts by mass of polyethyleneimine aqueous solution (molecular weight: about 10,000) were added to obtain a binder aqueous solution 8 (solid content: 11%).

Comparative Example 1

To a 1000 mL separable flask equipped with a stirrer, a cooling pipe, a thermometer, and a nitrogen introduction pipe were added 420 parts by mass of ion exchange water, 40 parts by mass (0.59 mol) of acrylic acid, and 0.24 parts by mass (0.0016 mol) of N,N-methylenebisacrylamide, followed by heating under a nitrogen stream until the internal temperature reached 77° C. Next, 0.30 parts by mass of 2,2'-azobis[N-(2-carboxyethyl)-2-methylpropionamidine] tetrahydrate were added thereto, and the obtained solution was reacted at 77° C. for 4 hours. After the reaction was complete, the reaction solution was cooled to room temperature, and 37 parts by mass of 48% sodium hydroxide aqueous solution were added to obtain a binder aqueous solution 101 (solid content: 10%).

Comparative Example 2

To a 200 mL separable flask equipped with a stirrer, a cooling pipe, a thermometer, and a nitrogen introduction pipe were added 135 parts by mass of ion exchange water and 15 parts by mass (0.13 mol) of 2-hydroxyethyl acrylate, followed by heating under a nitrogen stream until the internal temperature reached 75° C. Next, 0.054 parts by mass of 2,2'-azobis[N-(2-carboxyethyl)-2-methylpropionamidine] tetrahydrate were added thereto, and the obtained solution was reacted at 75° C. for 4 hours. After the reaction was complete, the reaction solution was cooled to room temperature to obtain a binder aqueous solution 102 (solid content: 10%).

Comparative Example 3

To a 1000 mL separable flask equipped with a stirrer, a cooling pipe, a thermometer, and a nitrogen introduction pipe were added 575 parts by mass of ion exchange water, 45 parts by mass (0.62 mol) of acrylic acid, 11 parts by mass (0.056 mol) of 2-acryloyloxyethyl acid phosphate (trade name: LIGHT ACRYLATE P-1A (N), manufactured by Kyoeisha Chemical Co., Ltd.), and 0.18 parts by mass (0.00097 mol) of diethylene glycol diallyl ether (manufactured by FUJIFILM Wako Pure Chemical Corporation), followed by heating under a nitrogen stream until the internal temperature reached 77° C. Next, 0.10 parts by mass of 2,2'-azobis[N-(2-carboxyethyl)-2-methylpropionamidine] tetrahydrate were added thereto, and the obtained solution was reacted at 77° C. for 4 hours. After the reaction was complete, the reaction solution was cooled to room temperature, and 41 parts by mass of 48% sodium hydroxide aqueous solution were added to obtain a binder aqueous solution 103 (solid content: 10%).

With regard to the binder aqueous solutions 1 to 8 obtained in Examples 1 to 8 and the binder aqueous solutions 101 to 103 obtained in Comparative Examples 1 to 3, Table 1 shows the "binder component corresponding to the monomer of (i)", the "binder component corresponding to the monomer of (ii)", the "content ratio (molar ratio) of the structural unit derived from the monomer of (i) to the structural unit derived from the monomer of (ii)", the "binder component corresponding to the monomer of (iii)", and the "content (mol %) of structural units derived from the monomer of (iii) with respect to the total content of the structural units derived from the monomer of (i) and the monomer of (ii)" for the binder in each binder aqueous solution. In addition, Table 1 also shows the "components of a neutralizing agent" and the "degree of neutralization (%) by the neutralizing agent" for the binder in each binder aqueous solution.

ration), 0.92 parts by mass of acetylene black (trade name: DENKA BLACK (registered trademark) powder, average particle diameter: 35 nm, specific surface area: 68 $m^2/g$, manufactured by Denka Company Limited) as a conductive assistant, 1.0 parts by mass of the binder aqueous solution 1 (solid content: 10%) obtained in Example 1, and 18.1 parts by mass of water as a solvent were mixed and stirred. The obtained aqueous dispersion liquid of the conductive assistant and the binder is referred to as a slurry for measurement.

(2) Measuring Method of Loss Tangent Tan δ

The obtained slurry for measurement was set on a sample table. The slurry for measurement was adjusted to a thickness of 1 mm with a parallel plate (PP50). Then, strain dispersion measurement was carried out using a rheometer (product name: MCR 102, manufactured by Anton Paar GmbH) at a measurement temperature of 25° C., a frequency

TABLE 1

| | Monomer of (i) | Monomer of (ii) (ii)-1 | Monomer of (ii) (ii)-2 | Content ratio (i):(ii) (molar ratio) | Monomer of (iii) | Content of monomer of (iii) | Neutralizing agent 1 | Degree of neutralization of neutralizing agent 1 | Neutralizing agent 1 | Degree of neutralization neutralization of agent 2 |
|---|---|---|---|---|---|---|---|---|---|---|
| Binder aqueous solution 1 (Example 1) | AA | 2HEA | — | 62:38 | MBAA | 0.28 mol % | NaOH | 80% | — | — |
| Binder aqueous solution 2 (Example 2) | AA | 2HEA | — | 15:85 | MBAA | 0.28 mol % | NaOH | 80% | — | — |
| Binder aqueous solution 3 (Example 3) | AA | 2HEA | — | 28:72 | MBAA | 0.34 mol % | NaOH | 80% | — | — |
| Binder aqueous solution 4 (Example 4) | AA | 4HBA | — | 82:18 | PETE | 0.13 mol % | NaOH | 80% | — | — |
| Binder aqueous solution 5 (Example 5) | AA | 2HEA | — | 15:85 | — | — | NaOH | 80% | — | — |
| Binder aqueous solution 6 (Example 6) | AA | 2HEA | — | 15:85 | — | — | NaOH | 72% | PEI | 8% |
| Binder aqueous solution 7 (Example 7) | AA | 2HEA | 4HBA | 16:84 | — | — | NaOH | 80% | — | — |
| Binder aqueous solution 8 (Example 8) | AA | 2HEA | 4HBA | 16:84 | — | — | NaOH | 72% | PEI | 8% |
| Binder aqueous solution 101 (Comparative Example 1) | AA | — | — | 100:0 | MBAA | 0.27 mol % | NaOH | 80% | — | — |
| Binder aqueous solution 102 (Comparative Example 2) | — | 2HEA | — | 0:100 | — | — | — | — | — | — |
| Binder aqueous solution 103 (Comparative Example 3) | AA | 2AOEP | — | 92:8 | DGDA | 0.14 mol % | NaOH | 80% | — | — |

AA: acrylic acid,
2HEA: 2-hydroxyethylacrylate,
4HBA: 4-hydroxybutylacrylate
MBAA: N,N-methylenebisacrylamide,
PETE: pentaerythritoltriallylether
PEI: polyethyleneimine
2AOEP: 2-(acryloyloxy)ethylacidphosphate,
DGDA: diethyleneglycoldiallylether Experimental Example 1

(1) Sample Preparation

Using a planetary mixer (product name: AWATORI RENTARO, Model ARE-310, manufactured by Thinky Corpoof 1 Hz, and a strain amount in a range of $10^{-2}$% to $10^3$%. The loss tangent tan δ (loss elastic modulus G"/storage elastic modulus G') in the linear region of the slurry for measurement was calculated from the obtained values of the storage elastic modulus G' and the loss elastic modulus G".

Experimental Examples 2 to 8

Slurries for measurement were prepared in the same manner as in Experimental Example 1, except that each of the binder aqueous solutions 2 to 8 obtained in Examples 2 to 8 was used instead of the binder aqueous solution 1, and then the loss tangent tan δ was calculated.

Comparative Experimental Examples 1 to 3

Slurries for measurement were prepared in the same manner as in Experimental Example 1, except that each of the binder aqueous solutions 101 to 103 obtained in Comparative Examples 1 to 3 was used instead of the binder aqueous solution 1, and then the loss tangent tan δ was calculated.

Experimental Example 9

(1) Preparation of Slurry Composition

The following components were weighed: 2.1 g of carbon-coated SiO powder (particle size: 5 μm, manufactured by Osaka Titanium Technologies Co., Ltd.), 5.0 g of natural graphite (particle size: 20 μm, manufactured by Hitachi Kasei Kogyo Kabushiki Kaisha), 0.50 g of acetylene black (trade name: DENKA BLACK (registered trademark) powder, manufactured by Denka Company Limited), and 4.0 g of the binder aqueous solution 1 (solid content: 10%) obtained in Example 1. 8.6 g of water was further added thereto. These components were mixed and stirred using a planetary mixer (product name: AWATORI RENTARO, Model ARE-310, manufactured by Thinky Corporation) at a rotation speed of 2000 rpm for 30 minutes. The obtained mixture was used as a slurry composition.

(2) Production of Electrode for Lithium Secondary Battery

The slurry composition obtained in (1) was coated to a copper collector using a doctor blade so as to have a thickness of 75 μm. Next, it was first dried in air at 80° C., and then the dried electrode was pressed with a roll press machine such that a volume density was 1.5 g/cm³. The pressed electrode was dried under vacuum at 150° C. for 12 hours.

(3) Production of Coin Cell Battery

A coin cell battery was produced in a glove box filled with argon. A coin cell battery consisting of the electrode obtained in (2), a lithium foil electrode, a solution of 2% by mass of vinylene carbonate (VC) added to ethylene carbonate (EC)/dimethyl carbonate (DMC) (volume ratio=1:1) containing 1 M $LiPF_6$, and a separator was assembled.

(4) Charge/Discharge Test

A charge/discharge test was carried out under the following conditions, using the coin cell battery produced in (3).
  Counter electrode: lithium foil
  Electrolytic solution: 1M $LiPF_6$ EC/DMC mixed solution (volume ratio=1:1)+VC 2% by mass
  Measuring device: ABE1024-5V 0.1A-4 charge/discharge test device (manufactured by ElectroField Co., Ltd.)
  Charge/discharge conditions
  First Cycle
  Charge constant current constant voltage 0.1 C 0.02 V 15 hours termination
  Discharge constant current 0.1 C 1.5 V termination
  After Second Cycle
  Charge constant current constant voltage 0.5 C 0.02 V 3 hours termination
  Discharge constant current 0.5 C 1.5 V termination The capacity retention rate (%) after 20 cycles was calculated using the following formula, from the values of the discharge capacity of the negative electrode (the electrode obtained in (2)) after the first charge/discharge and 20 cycles.

Capacity retention rate (%)=discharge capacity after20cycles/discharge capacity after first charge/discharge×100

Experimental Examples 10 to 16

Coin cell batteries were produced in the same manner as in Experimental Example 9, except that each of the binder aqueous solutions 2 to 8 obtained in Examples 2 to 8 was used instead of the binder aqueous solution 1, and the capacity retention rate (%) after 20 cycles was calculated in a charge/discharge test.

Comparative Experimental Examples 4 to 6

Coin cell batteries were produced in the same manner as in Experimental Example 9, except that each of the binder aqueous solutions 101 to 103 obtained in Comparative Examples 1 to 3 was used instead of the binder aqueous solution 1, and the capacity retention rate (%) after 20 cycles was calculated in a charge/discharge test.

Table 2 shows the tan δ values obtained in Experimental Examples 1 to 8 and Comparative Experimental Examples 1 to 3, and the capacity retention rates obtained in Experimental Examples 9 to 16 and Comparative Experimental Examples 4 to 6.

TABLE 2

| Experimental Example | Binder aqueous solution (Example) | tan δ | Capacity retention rate (%) |
|---|---|---|---|
| Experimental Example 1.9 | Binder aqueous solution 1 (Example 1) | 1.83 | 84 |
| Experimental Example 2.10 | Binder aqueous solution 2 (Example 2) | 1.20 | 84 |
| Experimental Example 3.11 | Binder aqueous solution 3 (Example 3) | 1.05 | 83 |
| Experimental Example 4.12 | Binder aqueous solution 4 (Example 4) | 1.40 | 84 |
| Experimental Example 5.13 | Binder aqueous solution 5 (Example 5) | 1.50 | 89 |
| Experimental Example 6.14 | Binder aqueous solution 6 (Example 6) | 1.30 | 94 |
| Experimental Example 7.15 | Binder aqueous solution 7 (Example 7) | 1.71 | 94 |
| Experimental Example 8.16 | Binder aqueous solution 8 (Example 8) | 2.18 | 94 |
| Comparative Experimental Example 1.4 | Binder aqueous solution 101 (Comparative Example 1) | 0.054 | 72 |
| Comparative Experimental Example 2.5 | Binder aqueous solution 102 (Comparative Example 2) | 0.15 | 49 |
| Comparative Experimental Example 3.6 | Binder aqueous solution 103 (Comparative Example 3) | 0.83 | 58 |

From Table 2, in a case of the binder aqueous solutions 1 to 8 obtained in Examples 1 to 8, the tan δ of the slurry for measurement showed a value larger than 1, and the capacity retention rate in the charge/discharge test was 80% or more. This is considered to be due to the fact that the binder having tan δ>1 under the measurement conditions in the first invention was excellent in the dispersibility of the conductive assistant, and therefore the battery using this binder was able to maintain good battery characteristics even after 20 cycles of charge and discharge.

On the other hand, in a case of the binder aqueous solutions 101 to 103 obtained in Comparative Examples 1 to 3, the tan δ of the slurry for measurement was 1 or less, and the capacity retention rate in the charge/discharge test was less than 80%. This is considered to be due to the fact that the dispersibility of the conductive assistant was insufficient with the binder having tan δ≤1 under the measurement conditions in the first invention, and therefore the battery using this binder could not sufficiently transmit electrons.

Example 9

To a 1000 mL separable flask equipped with a stirrer, a cooling pipe, a thermometer, and a nitrogen introduction pipe were added 280 parts by mass of ion exchange water, 4 parts by mass (0.06 mol) of acrylic acid (manufactured by Toagosei Co., Ltd.), and 36 parts by mass (0.76 mol) of 2-hydroxyethyl acrylate (manufactured by Osaka Organic Chemical Industry Ltd.), followed by heating under a nitrogen stream until the internal temperature reached 77° C. Next, 0.31 parts by mass of 2,2'-azobis[N-(2-carboxyethyl)-2-methylpropionamidine]tetrahydrate (trade name: VA-057, manufactured by FUJIFILM Wako Pure Chemical Corporation) were added thereto, and the obtained solution was reacted at 77° C. for 4 hours. After the reaction was complete, the reaction solution was cooled to room temperature, and an aqueous solution prepared by adding 40 parts by mass of ion exchange water to 4.6 parts by mass of pentylamine (manufactured by FUJIFILM Wako Pure Chemical Corporation) was added dropwise to obtain a binder aqueous solution 9 (solid content: 14%).

Examples 10 to 34

Binder aqueous solutions 10 to 34 were obtained in the same manner as in Example 9, except that each of amines shown in Table 3 below was used instead of 4.6 parts by mass of pentylamine.

TABLE 3

| Example | Amine name | Amount used (parts by mass) | Degree of neutralization (%) | Molecular weight | Number of basic functional groups | Amine value (meq./g) |
|---|---|---|---|---|---|---|
| Example 9 | Pentylamine | 4.60 | 95 | 87.16 | 1 | 11.5 |
| Example 10 | Octylamine | 6.82 | 95 | 129.24 | 1 | 7.7 |
| Example 11 | Dibutylamine | 6.82 | 95 | 129.24 | 1 | 7.7 |
| Example 12 | Benzylamine | 5.65 | 95 | 107.15 | 1 | 9.3 |
| Example 13 | Aniline | 4.91 | 95 | 93.13 | 1 | 10.7 |
| Example 14 | Ethanolamine | 3.22 | 95 | 61.08 | 1 | 16.4 |
| Example 15 | N,N-diethylethanolamine | 6.18 | 95 | 117.19 | 1 | 8.5 |
| Example 16 | Benzyltrimethylammonium hydroxide | 8.82 | 95 | 167.25 | 1 | 6.0 |
| Example 17 | Tetrabutylammonium hydroxide | 13.68 | 95 | 259.47 | 1 | 3.9 |
| Example 18 | Tetrabutylphosphonium hydroxide | 14.58 | 95 | 276.44 | 1 | 3.6 |
| Example 19 | Diazabicycloundecene | 8.03 | 95 | 152.24 | 1 | 6.6 |
| Example 20 | Diisopropylethylamine | 6.82 | 95 | 129.30 | 1 | 7.7 |
| Example 21 | Tris(2-cyanoethyl)amine | 9.29 | 95 | 176.22 | 1 | 5.7 |
| Example 22 | Bis(2-cyanoethyl)amine | 6.49 | 95 | 123.16 | 1 | 8.1 |
| Example 23 | 3-Aminopropionitrile | 3.70 | 95 | 70.09 | 1 | 14.3 |
| Example 24 | 3-Methoxypropylamine | 4.70 | 95 | 89.14 | 1 | 11.2 |
| Example 25 | 3-Aminotriazole | 4.43 | 95 | 84.08 | 1 | 11.9 |
| Example 26 | 3,5-Diaminotriazole | 5.23 | 95 | 99.10 | 2 | 20.2 |
| Example 27 | 4-Dimethylaminopyridine | 6.44 | 95 | 122.17 | 2 | 16.4 |
| Example 28 | JEFFAMINE (registered trademark) D-400 | 11.80 | 95 | (400) | 2 | 4.5 |
| Example 29 | JEFFAMINE (registered trademark) ED-600 | 16.13 | 95 | (600) | 2 | 3.3 |
| Example 30 | Polyethylenemine | 2.27 | 95 | Xpermonomer unit | 1 | 23.2 |
| Example 31 | Ethylenediamine | 1.58 | 95 | 60.10 | 2 | 33.3 |
| Example 32 | 1,2-Propanediamine | 1.95 | 95 | 74.12 | 2 | 27.0 |
| Example 33 | N-Methyl-1,3-propanediamine | 2.32 | 95 | 88.15 | 2 | 22.7 |
| Example 34 | Tris(2-aminoethyl)amine | 1.93 | 95 | 146.23 | 4 | 27.4 |

Example 35

To a 1000 mL separable flask equipped with a stirrer, a cooling pipe, a thermometer, and a nitrogen introduction pipe were added 320 parts by mass of ion exchange water, 20 parts by mass (0.28 mol) of acrylic acid (manufactured by Toagosei Co., Ltd.), 20 parts by mass (0.43 mol) of 2-hydroxyethyl acrylate (manufactured by Osaka Organic Chemical Industry Ltd.), and 0.19 parts by mass (0.0013 mol) of N,N-methylenebisacrylamide (manufactured by FUJIFILM Wako Pure Chemical Corporation), followed by heating under a nitrogen stream until the internal temperature reached 77° C. Next, 0.31 parts by mass of 2,2'-azobis [N-(2-carboxyethyl)-2-methylpropionamidine] tetrahydrate (trade name: VA-057, manufactured by FUJIFILM Wako Pure Chemical Corporation) were added thereto, and the obtained solution was reacted at 77° C. for 4 hours. After the reaction was complete, the reaction solution was cooled to room temperature, an aqueous solution prepared by adding 40 parts by mass of ion exchange water to 18.5 parts by mass of 48% sodium hydroxide aqueous solution (manufactured by Toagosei Co., Ltd.) was added dropwise, and then an aqueous solution prepared by adding 40 parts by mass of ion exchange water to 3.6 parts by mass of pentylamine (manufactured by FUJIFILM Wako Pure Chemical Corporation) was added dropwise to obtain a binder aqueous solution 35 (solid content: 11%).

Examples 36 to 39

Binder aqueous solutions 36 to 39 were obtained in the same manner as in Example 35, except that each of the amines shown in Table 4 below was used instead of 3.6 parts by mass of pentylamine.

TABLE 4

| Example | Concomitant amine name | Amount used (parts by mass) | Amine | NaOH | Molecular weight | Number of basic functional groups | Amine value (meq./g) |
|---|---|---|---|---|---|---|---|
| Example 35 | Pentylamine | 0.73 | 15 | 80 | 87.16 | 1 | 11.5 |
| Example 36 | 3-Methoxypropylamine | 0.74 | 15 | 80 | 89.14 | 1 | 11.2 |
| Example 37 | 3-Aminotriazole | 0.70 | 15 | 80 | 84.08 | 1 | 11.9 |
| Example 38 | 3,5-Diaminotriazole | 0.83 | 15 | 80 | 99.10 | 2 | 20.2 |
| Example 39 | JEFFAMINE (registered trademark) ED-600 | 2.55 | 5 | 80 | (600) | 2 | 3.3 |

Experimental Example 17

(1) Preparation of Slurry Composition and Production of Electrode for Lithium Secondary Battery An electrode for a lithium secondary battery was produced in the same manner as in (1) Preparation of slurry composition and (2) Production of electrode for lithium secondary battery in Experimental Example 9, except that the binder aqueous solution 9 obtained in Example 9 was used instead of the binder aqueous solution 1.

(2) Bend Resistance Test

The electrode produced in (1) was cut out to a size of 10 mm×100 mm and set in a mandrel tester (BEVS1603 cylindrical bending tester). Then, the diameter of the mandrel rod around which the electrode was wound was gradually reduced from 32 mm, and the diameter at which the electrode cracked (mandrel diameter) was measured. The case where the mandrel diameter was 2 mm to 6 mm was evaluated as A; the case where the mandrel diameter was 7 mm to 9 mm was evaluated as B; the case where the mandrel diameter was 10 mm to 12 mm was evaluated as C; and the case where the mandrel diameter was 13 mm or more was evaluated as D.

(3) Production of Coin Cell Battery

A coin cell battery was produced in a glove box filled with argon. A coin cell battery consisting of the electrode obtained in (1), a lithium foil electrode, a solution of 2% by mass of vinylene carbonate (VC) added to ethylene carbonate (EC)/dimethyl carbonate (DMC) (volume ratio=1:1) containing 1 M $LiPF_6$, and a separator was assembled.

(4) Charge/Discharge Test

A charge/discharge test was carried out using the coin cell battery produced in (3), under the same conditions as those described in (4) Charge/discharge test of Experimental Example 9.

Experimental Examples 18 to 42

The bend resistance test and the charge/discharge test were carried out in the same manner as in Experimental Example 17, except that each of the binder aqueous solutions 10 to 34 obtained in Examples 10 to 34 was used instead of the binder aqueous solution 9.

Table 4 shows the evaluation results obtained in the bend resistance test in Experimental Examples 17 to 42 and the capacity retention rates obtained in the charge/discharge test in Experimental Examples 17 to 42.

TABLE 5

| Experimental Example | Example | Amine name | Amine value (meq/g) | Mandrel diameter evaluation | Capacity retention rate (%) |
|---|---|---|---|---|---|
| Experimental Example 17 | Example 9 | Pentylamine | 9.9 | B | 94 |
| Experimental Example 18 | Example 10 | Octylamine | 7.7 | B | 92 |
| Experimental Example 19 | Example 11 | Dibutylamine | 7.7 | B | 91 |
| Experimental Example 20 | Example 12 | Benzylamine | 9.3 | B | 90 |
| Experimental Example 21 | Example 13 | Aniline | 10.7 | B | 89 |
| Experimental Example 22 | Example 14 | Ethanolamine | 16.4 | A | 91 |
| Experimental Example 23 | Example 15 | N,N-diethylethanolamine | 8.5 | A | 91 |
| Experimental Example 24 | Example 16 | Benzyltrimethylammonium hydroxide | 6.0 | A | 85 |
| Experimental Example 25 | Example 17 | Tetrabutylammonium hydroxide | 3.9 | A | 84 |
| Experimental Example 26 | Example 18 | Tetrabutylphosphonium hydroxide | 3.6 | A | 82 |

TABLE 5-continued

| Experimental Example | Example | Amine name | Amine value (meq/g) | Mandrel diameter evaluation | Capacity retention rate (%) |
|---|---|---|---|---|---|
| Experimental Example 27 | Example 19 | Diazabicycloundecene | 6.6 | B | 90 |
| Experimental Example 28 | Example 20 | Diisopropylethylamine | 7.7 | A | 92 |
| Experimental Example 29 | Example 21 | Tris(2-cyanoethyl)amine | 5.7 | B | 97 |
| Experimental Example 30 | Example 22 | Bis(2-cyanoethyl)amine | 8.1 | B | 97 |
| Experimental Example 31 | Example 23 | 3-Aminopropionitrile | 14.3 | C | 98 |
| Experimental Example 32 | Example 24 | 3-Methoxypropylamine | 11.2 | A | 93 |
| Experimental Example 33 | Example 25 | 3-Aminotriazole | 11.9 | A | 97 |
| Experimental Example 34 | Example 26 | 3,5-Diaminotriazole | 20.2 | A | 98 |
| Experimental Example 35 | Example 27 | 4-Dimethylaminopyridine | 16.4 | B | 90 |
| Experimental Example 36 | Example 28 | JEFFAMINE D-400 | 4.5 | A | 96 |
| Experimental Example 37 | Example 29 | JEFFAMINE ED-600 | 3.3 | A | 87 |
| Experimental Example 38 | Example 30 | Polyethyleneimine | 23.2 | D | 95 |
| Experimental Example 39 | Example 31 | Ethylenediamine | 33.3 | D | 86 |
| Experimental Example 40 | Example 32 | 1,2-Propanediamine | 27.0 | D | 86 |
| Experimental Example 41 | Example 33 | N-Methyl-1,3-propanediamine | 22.7 | D | 84 |
| Experimental Example 42 | Example 34 | Tris(2-aminoethyl)amine | 27.4 | D | 86 |

Experimental Examples 43 to 47

The bend resistance test and the charge/discharge test were carried out in the same manner as in Experimental Example 17, except that each of the binder aqueous solutions 35 to 39 obtained in Examples 35 to 39 was used instead of the binder aqueous solution 9.

Table 6 shows the evaluation results obtained in the bend resistance test in Experimental Examples 43 to 47 and the capacity retention rates obtained in the charge/discharge test in Experimental Examples 43 to 47.

TABLE 6

| Experimental Example | Example | Concomitant amine name | Amine value (meq/g) | Mandrel diameter evaluation | Capacity retention rate (%) |
|---|---|---|---|---|---|
| Experimental Example 43 | Example 35 | Pentylamine | 11.5 | B | 94 |
| Experimental Example 44 | Example 36 | 3-Methoxypropylamine | 11.2 | A | 93 |
| Experimental Example 45 | Example 37 | 3-Aminotriazole | 11.9 | A | 92 |
| Experimental Example 46 | Example 38 | 3,5-Diaminotriazole | 20.2 | A | 93 |
| Experimental Example 47 | Example 39 | JEFFAMINE (registered trademark) ED- | 3.3 | A | 86 |

From Table 5, in a case of the electrodes (Experimental Examples 17 to 34) using the binder aqueous solutions 9 to 29 obtained in Examples 9 to 29, the mandrel diameter evaluation was A to C, the bend resistance was high, and the capacity retention rate was 80% or more. It is considered that the hydrophobic group of the amine used for neutralization lowered the glass transition point of the binder to make the binder flexible, thereby increasing the bend resistance. In addition, it is considered that good battery characteristics were maintained since the structure was similar to that of the first invention.

In addition, from Table 6, in a case of the electrodes (Experimental Examples 43 to 47) using the binder aqueous solutions 35 to 39 obtained in Examples 35 to 39, the mandrel diameter evaluation was A to B, the bend resistance was high, and the capacity retention rate was 85% or more. Therefore, it is considered that the bend resistance was improved because the effect of reducing the glass transition point of the binder is exhibited as in the electrodes of Experimental Examples 17 to 34, even in a case where the molar ratios of the monomer of (i) to the monomer of (ii) and the presence or absence of the crosslinking structure are different.

On the other hand, in a case of the electrodes (Experimental Examples 38 to 42) using the binder aqueous solutions 30 to 34 obtained in Examples 30 to 34, the mandrel diameter evaluation was D and the bend resistance was deteriorated. It is considered that polyvalent amines having a high amine value had a short distance between the neutralizing amines, and therefore the binder became rigid, the electrode became hard, and the bend resistance deteriorated.

The invention claimed is:

1. A binder for an electricity storage device, wherein a loss tangent tan δ in a linear region of an aqueous dispersion liquid of 0.5% by mass of the binder and 4.6% by mass of a conductive assistant satisfies tan δ>1 in a strain dispersion measurement under measurement conditions of a measurement temperature of 25° C. and a frequency of 1 Hz,
wherein the conductive assistant is an acetylene black having an average particle diameter of 30 nm or more and 40 nm or less and a specific surface area of 65 m$^2$/g or more and 70 m$^2$/g or less.

2. The binder according to claim 1, wherein the binder contains a polymer or a salt thereof containing structural units derived from (i) an ethylenically unsaturated carboxylic acid monomer and (ii) an ethylenically unsaturated monomer having at least one group selected from a hydroxy group, a dialkylamino group, an acetyl group, a sulfo group, a phosphate group, or a cyano group.

3. The binder according to claim 2, wherein the monomer of (ii) has a solubility in water at 20° C. of 1 g/L or more.

4. The binder according to claim 2, wherein the monomer of (ii) has an SP value of 11.5 (cal/cm$^3$)$^{1/2}$ or more.

5. The binder according to claim 2, wherein the monomer of (ii) is a monomer represented by the following general formula [1]:

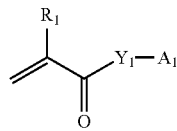

[1]

in the general formula [1], R$_1$ represents a hydrogen atom or a methyl group, Y$_1$ represents —O— or —NR$_2$—, R$_2$ represents a hydrogen atom or a methyl group, and A$_1$ represents a monovalent group having at least one group selected from a hydroxy group, a dialkylamino group, an acetyl group, a sulfo group, a phosphate group, or a cyano group.

6. The binder according to claim 2, wherein the monomer of (ii) is a monomer represented by the following general formula [2]:

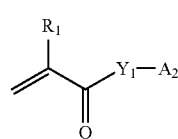

[2]

in the general formula [2], R$_1$ represents a hydrogen atom or a methyl group, Y$_1$ represents —O— or —NR$_2$—, R$_2$ represents a hydrogen atom or a methyl group, and A$_2$ represents an alkyl group having 1 to 10 carbon atoms and having 1 to 3 groups of any one selected from a hydroxy group, a dialkylamino group, an acetyl group, a sulfo group, a phosphate group, or a cyano group; or a linear alkyl group having 3 to 36 carbon atoms and having 1 hydroxy group and 1 to 5 ester bonds in a chain thereof.

7. The binder according to claim 2, wherein the polymer or the salt thereof further contains a structural unit derived from (iii) a monomer having two or more polymerizable unsaturated groups.

8. The binder according to claim 2, wherein the polymer or the salt thereof is neutralized with a hydroxide of an alkali metal and/or a polyvalent amine having an amine value of 21 or more.

9. A slurry composition for an electricity storage device, comprising the binder according to claim 1.

10. An electrode for an electricity storage device, comprising the slurry composition according to claim 9.

11. An electricity storage device comprising the electrode according to claim 10.

* * * * *